US012669166B2

(12) United States Patent
Sato et al.

(10) Patent No.: US 12,669,166 B2
(45) Date of Patent: Jun. 30, 2026

(54) BALL SCREW DEVICE

(71) Applicant: NSK Ltd., Tokyo (JP)

(72) Inventors: Kanta Sato, Kanagawa (JP); Yasuaki Abe, Kanagawa (JP); Yasumi Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 27 days.

(21) Appl. No.: 18/833,017

(22) PCT Filed: Jan. 19, 2023

(86) PCT No.: PCT/JP2023/001490
§ 371 (c)(1),
(2) Date: Jan. 15, 2025

(87) PCT Pub. No.: WO2023/145595
PCT Pub. Date: Aug. 3, 2023

(65) Prior Publication Data
US 2025/0137515 A1 May 1, 2025

(30) Foreign Application Priority Data

Jan. 26, 2022 (JP) ................................. 2022-009887
Dec. 13, 2022 (JP) ................................. 2022-198420

(51) Int. Cl.
*F16H 25/22* (2006.01)
*F16H 25/24* (2006.01)

(52) U.S. Cl.
CPC ......... *F16H 25/2223* (2013.01); *F16H 25/24* (2013.01)

(58) Field of Classification Search
CPC .. F16H 25/2223; F16H 25/24; F16H 15/2228; F16H 25/2219; F16H 15/2204
See application file for complete search history.

(56) References Cited

U.S. PATENT DOCUMENTS 3,815,435 A * 6/1974 Eschenbacher ..... F16H 25/2223
74/459.5
4,887,480 A * 12/1989 Pollo ................... F16H 25/2223
74/424.87

(Continued)

FOREIGN PATENT DOCUMENTS

JP 58-52359 U 4/1983
JP 4-110255 U 9/1992

(Continued)

OTHER PUBLICATIONS

International Search Report for PCT/JP2023/001490 dated Feb. 21, 2023.

*Primary Examiner* — Zakaria Elahmadi
(74) *Attorney, Agent, or Firm* — Sughrue Mion, PLLC

(57) ABSTRACT

A ball screw device of the present disclosure includes: a screw shaft in which an outer peripheral raceway surface is provided on an outer peripheral surface; a nut into which the screw shaft is inserted and in which an inner peripheral raceway surface is provided on an inner peripheral surface; a plurality of balls arranged on a raceway between the outer peripheral raceway surface and the inner peripheral raceway surface; and at least one deflector provided with an S-shaped groove surface that circulates the balls. The outer peripheral surface of the screw shaft is provided with a recess portion that is recessed to an inner side in a radial direction and that houses the deflector, and an inner peripheral surface of the recess portion and an outer peripheral surface of the deflector are not circular when viewed from an outer side in the radial direction of the screw shaft.

17 Claims, 18 Drawing Sheets

(56)          References Cited

U.S. PATENT DOCUMENTS

| | | | | |
|---|---|---|---|---|
| 5,228,353 | A | 7/1993 | Katahira et al. | |
| 7,305,902 | B2 | 12/2007 | Inoue et al. | |
| 2011/0146436 | A1* | 6/2011 | Brown | F16H 25/2223 |
| | | | | 74/424.82 |
| 2013/0220047 | A1* | 8/2013 | Yokoyama | F16H 25/2214 |
| | | | | 74/424.87 |

FOREIGN PATENT DOCUMENTS

| | | | | | |
|---|---|---|---|---|---|
| JP | 2003-166616 | A | | 6/2003 | |
| JP | 2009-250345 | A | | 10/2009 | |
| JP | 2015-175406 | A | | 10/2015 | |
| JP | 2017-207092 | A | | 11/2017 | |
| JP | 2019-190506 | A | | 10/2019 | |
| JP | 2021116825 | A | * | 8/2021 | |
| WO | WO-2015137494 | A1 | * | 9/2015 | B22F 3/225 |

* cited by examiner

BALL SCREW DEVICE

CROSS REFERENCE TO RELATED APPLICATIONS

This application is a National Stage of International Application No. PCT/JP2023/001490 filed Jan. 19, 2023, claiming priority based on Japanese Patent Application No. 2022-009887 filed Jan. 26, 2022 and Japanese Patent Application No. 2022-198420 filed Dec. 13, 2022.

FIELD

The present disclosure relates to a ball screw device.

BACKGROUND

A ball screw device includes a nut, a screw shaft penetrating the nut, a plurality of balls rolling on a raceway between the nut and the screw shaft, and a circulation component. The circulation component is a component to return the balls moved from one end of the raceway to the other end of the raceway to the one end of the raceway. One example of the circulation component is a deflector that returns the balls by one lead. In a ball screw device of Patent Literature in the following, a recess portion recessed to an inner side in a radial direction is provided in an outer peripheral surface of a screw shaft. A deflector is fitted into the recess portion.

CITATION LIST

Patent Literature

Patent Literature 1: Japanese Utility Model Application Laid-open No. 58-52359

SUMMARY

Technical Problem

According to Patent Literature described above, an inner peripheral surface of the recess portion and an outer peripheral surface of the deflector are circular when viewed from an outer side in the radial direction of the screw shaft. Thus, when the deflector is assembled to the recess portion, it is necessary to position the deflector in such a manner that an outer peripheral raceway surface of the screw shaft and an S-shaped groove surface of the deflector are continuous. Thus, the assembling work requires labor.

The present disclosure has been made in view of the above, and an object thereof is to provide a ball screw device in which a deflector is easily assembled.

Solution to Problem

To achieve the above object, a ball screw device according to an embodiment of the present disclosure comprising: a screw shaft in which an outer peripheral raceway surface is provided on an outer peripheral surface;

a nut into which the screw shaft is inserted and in which an inner peripheral raceway surface is provided on an inner peripheral surface; a plurality of balls arranged on a raceway between the outer peripheral raceway surface and the inner peripheral raceway surface; and at least one deflector provided with an S-shaped groove surface that circulates the balls, wherein the outer peripheral surface of the screw shaft is provided with a recess portion that is recessed to an inner side in a radial direction and that houses the deflector, and an inner peripheral surface of the recess portion and an outer peripheral surface of the deflector are not circular when viewed from an outer side in the radial direction of the screw shaft.

According to the invention, a direction of a deflector is positioned only by insertion of the deflector into a recess portion. That is, work of positioning the direction of the deflector in such a manner that an S-shaped groove surface and an outer peripheral raceway surface are continuous becomes unnecessary. Thus, the deflector is easily assembled.

Further, as a preferable embodiment of the ball screw device, a height of a screw thread on the outer peripheral raceway surface is higher than a height of a screw thread on the inner peripheral raceway surface.

According to the above configuration, since a screw thread of the outer peripheral raceway surface becomes high, it is possible to prevent the balls from riding on a groove shoulder of the outer peripheral raceway surface. Furthermore, in a case where the balls move from the outer peripheral raceway surface to the S-shaped groove surface of the deflector, according to the above configuration, since a bottom portion of the outer peripheral raceway surface is deep, a step amount between the outer peripheral raceway surface and the S-shaped groove surface of the deflector (movement amount in a radial direction) is small. On the other hand, in a case where a deflector is provided on a nut, since a bottom portion of an inner peripheral raceway surface is shallow, a step amount between the inner peripheral raceway surface and an S-shaped groove surface of the deflector (movement amount in the radial direction) is large. Thus, according to the present disclosure, a movement amount of the balls in the radial direction is controlled to be small, and the balls smoothly move in the S-shaped groove.

Further, as a preferable embodiment of the ball screw device, when viewed from the outer side in the radial direction of the screw shaft, a length in an intersection direction, which intersects with an axial direction parallel to the screw shaft, of the recess portion and the deflector is longer than a length thereof in the axial direction.

According to the above configuration, a ratio in the intersection direction on the S-shaped groove surface increases. That is, a degree of a curve of the S-shaped groove surface becomes gentle. Thus, the balls smoothly move in the S-shaped groove surface.

Further, as a preferable embodiment of the ball screw device, the outer peripheral surface of the deflector has interference with respect to the inner peripheral surface of the recess portion.

According to the above configuration, the deflector is fitted into the recess portion. Thus, the deflector is not detached from the recess portion.

Further, as a preferable embodiment of the ball screw device, the inner peripheral surface of the recess portion includes a pair of first facing surfaces facing each other, and a pair of second facing surfaces facing each other and arranged between the pair of first facing surfaces, the outer peripheral surface of the deflector includes a pair of first side surfaces facing the pair of first facing surfaces, and a pair of second side surfaces facing the pair of second facing surfaces, the pair of first facing surfaces and the pair of first side surfaces are linear when viewed from the outer side in the radial direction, the pair of second facing surfaces and the pair of second side surfaces have an arc shape when viewed from the outer side in the radial direction, and the pair of first side surfaces has the interference with respect to the pair of first facing surfaces.

According to the above configuration, it is easy to manage interference compared to a case where the interference is provided in each of the pair of second facing surfaces and the pair of second side surfaces. Thus, the deflector is easily manufactured.

Further, as a preferable embodiment of the ball screw device, the deflector is loosely fitted into the recess portion.

When the deflector is press-fitted (fitted) into the recess portion, the S-shaped groove surface of the deflector is deformed. Then, the S-shaped groove surface is deformed, and there is a possibility that the balls do not roll smoothly. On the other hand, according to the above configuration, the deflector is loosely fitted into the recess portion. Thus, deformation of the deflector is controlled.

Further, as a preferable embodiment of the ball screw device, the deflector includes at least one protrusion that protrudes from the outer peripheral surface and is crushed by abutting on the inner peripheral surface of the recess portion.

According to the above configuration, the protrusion makes it difficult for the deflector to come off the recess portion. Furthermore, although the small protrusion is deformed, deformation of the deflector (S-shaped groove surface) is avoided. Thus, the balls smoothly move in the S-shaped groove surface.

Further, as a preferable embodiment of the ball screw device, the S-shaped groove surface includes a central groove surface on which the balls sink to the inner side in the radial direction, and two entrance/exit groove surfaces which are respectively provided on both sides of the central groove surface and through which the balls enter and exit.

According to the above configuration, even when load on the outer side in the radial direction acts on the deflector, the entrance/exit groove surfaces come into contact with the balls abutting on the inner peripheral raceway surface, and the movement of the deflector to the outer side in the radial direction is regulated. Thus, the deflector is not detached from the recess portion.

Further, as a preferable embodiment of the ball screw device, a screw shaft-side opening of the outer peripheral raceway surface is provided in the inner peripheral surface of the recess portion, a deflector-side opening of the S-shaped groove surface is provided in the outer peripheral surface of the deflector, and a groove shape of the deflector-side opening is larger than a groove shape of the screw shaft-side opening.

According to the above configuration, even when the deflector moves to the outer side in the radial direction, an edge of the deflector-side opening does not move to an inner side of the screw shaft-side opening. Thus, the edge of the deflector-side opening is prevented from coming into contact with the balls.

Further, as a preferable embodiment of the ball screw device, the S-shaped groove surface includes a central groove surface on which the balls sink to the inner side in the radial direction, and two entrance/exit groove surfaces which are respectively provided on both sides of the central groove surface and through which the balls enter and exit, a groove shape of the entrance/exit groove surfaces is larger than a groove shape of the outer peripheral raceway surface, a deflector-side opening of the S-shaped groove surface is provided in the outer peripheral surface of the deflector, a screw shaft-side opening of the outer peripheral raceway surface that continues to the deflector-side opening is provided in the inner peripheral surface of the recess portion, and at least a part of a boundary line between the deflector-side opening and the screw shaft-side opening viewed from the outer side in the radial direction includes a linear portion extending linearly in an axial direction.

In a case where the balls move from the S-shaped groove surface of the deflector to the outer peripheral raceway surface of the screw shaft, the boundary line overlaps the balls when viewed from the outer side in the radial direction. That is, in the groove surface on the inner side in the radial direction of the balls, the outer peripheral raceway surface is arranged on one side in the axial direction, and the entrance/exit groove surfaces are arranged on the other side in the axial direction. In addition, the entrance/exit groove surfaces have a larger groove shape than the outer peripheral raceway surface. Thus, the balls are guided by the outer peripheral raceway surface, and easily moves to the other side in the axial direction (side where the entrance/exit groove surfaces are present when viewed from the outer peripheral raceway surface). In addition, when the balls move to the other side in the axial direction, there is a high possibility that the balls are sandwiched between the outer peripheral raceway surface and a groove shoulder of the inner peripheral raceway surface. That is, the balls do not roll smoothly, and conversion efficiency of the ball screw device is decreased. On the other hand, according to the present disclosure, the boundary line between the deflector-side opening and the screw shaft-side opening has the linear portion extending linearly in the axial direction, and a length of the boundary line in a spiral direction is short. Thus, the balls are less likely to be guided to the other side in the axial direction (side of the entrance/exit groove surfaces) by the outer peripheral raceway surface, and are less likely to be sandwiched between the outer peripheral raceway surface and the groove shoulder of the inner peripheral raceway surface. As a result, smooth rolling of the balls is secured, and a decrease in the conversion efficiency of the ball screw device is controlled.

Further, as a preferable embodiment of the ball screw device, the linear portion is orthogonal to a spiral direction in which the balls roll.

According to the above configuration, the length of the linear portion (boundary line) in the spiral direction becomes zero, and the length of the entire boundary line in the spiral direction becomes short. Thus, a section in which the outer peripheral raceway surface guides the balls to the other side in the axial direction (side of the entrance/exit groove surfaces) is shortened, and the balls are less likely to be sandwiched between the outer peripheral raceway surface and the groove shoulder of the inner peripheral raceway surface.

Further, in the ball screw device, the linear portion is parallel to the axial direction.

Further, as a preferable embodiment of the ball screw device, the entire boundary line is the linear portion.

The boundary line may include a curved portion due to a corner R portion provided at a corner portion of the deflector. In addition, a boundary line of a circular deflector of a conventional example also includes a curved portion. There is a case where the curved portion partially includes a portion extending in a spiral direction and a length in the spiral direction is relatively long. When the boundary line includes such a curved portion, the length of the boundary line in the spiral direction, that is, a section in which an outer peripheral raceway surface guides balls to the other side in an axial direction (side of entrance/exit groove surfaces) is also long. Thus, the balls are easily sandwiched between the outer peripheral raceway surface and a groove shoulder of an inner peripheral raceway surface. On the other hand, according to the above configuration, since the curved portion is not included, the length of the boundary line in the spiral direction is short. That is, a section in which the outer peripheral raceway surface guides the balls to the other side in the axial direction (side of the entrance/exit groove surfaces) is shortened, and the balls are less likely to be sandwiched between the outer peripheral raceway surface and the groove shoulder of the inner peripheral raceway surface.

Further, as a preferable embodiment of the ball screw device, the inner peripheral surface of the recess portion includes a pair of first peripheral surfaces facing each other and extending in a circumferential direction, the outer peripheral surface of the deflector includes a pair of second peripheral surfaces facing the first peripheral surfaces, and the first peripheral surfaces and the second peripheral surfaces are parallel to a spiral direction in which the balls roll.

The screw thread of the screw shaft includes a thin portion that is cut out by the recess portion and has a small thickness in an orthogonal direction orthogonal to the spiral direction. According to the above configuration, a first peripheral surface and a second peripheral surface extend in the spiral direction. Thus, the thickness of the thin portion in the orthogonal direction is uniform in the spiral direction. As a result, there is no region with low strength in the thin portion, and deformation of the screw thread (thin portion) is avoided.

Further, as a preferable embodiment of the ball screw device, the nut includes a nut main body having a cylindrical shape and provided with the inner peripheral raceway surface on an inner peripheral surface, and a lid portion that seals one opening of the nut main body.

According to the above configuration, another component can be pressed by the lid portion of the nut. That is, the nut can have a function of a piston, and the number of components can be reduced. In addition, in a case where a nut and a piston are separate components, it is necessary to externally fit the piston to the nut, and a ball screw device becomes large. On the other hand, according to the present disclosure, it is not necessary to externally fit the piston to the nut, and the ball screw device is downsized.

Advantageous Effects of Invention

According to a ball screw device of the present disclosure, assembling of a deflector becomes easy.

DESCRIPTION OF EMBODIMENTS

Hereinafter, the present disclosure will be described in detail with reference to the drawings. Note that the present disclosure is not limited by the following modes for carrying out the invention (hereinafter, referred to as embodiments). In addition, components in the following embodiments include those that can be easily assumed by those skilled in the art, those that are substantially the same, and those within a so-called equivalent range. Furthermore, the components disclosed in the following embodiments can be appropriately combined.

First Embodiment

Figure 1:
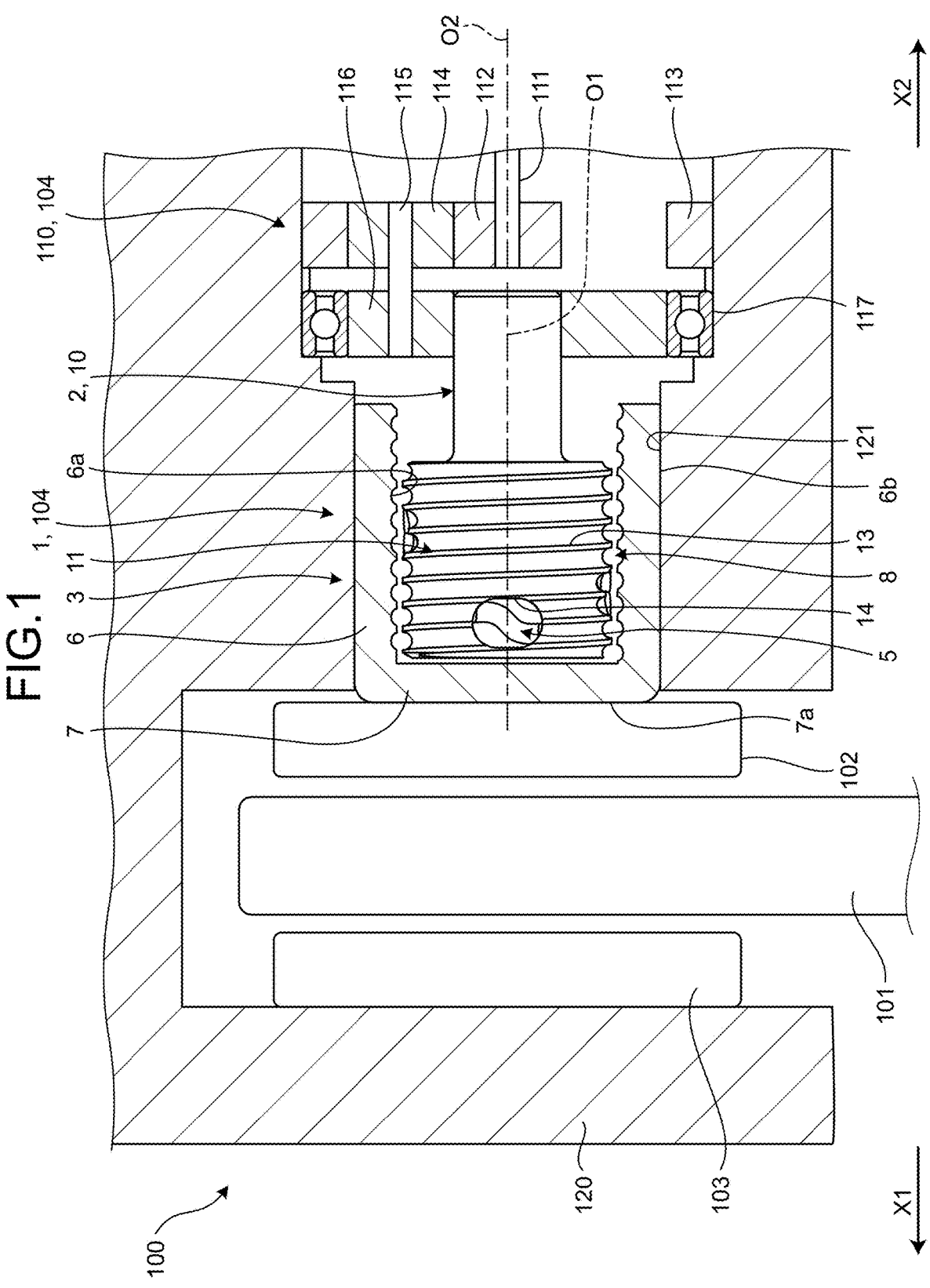
FIG. 1 is a cross-sectional view of a brake caliper of a first embodiment.

FIG. 1 is a cross-sectional view of a brake caliper of the first embodiment. As illustrated in FIG. 1, a brake caliper 100 is a device to sandwich a brake disk 101 that rotates together with a wheel (not illustrated) between two brake pads 102 and 103, and to control a rotary motion of the wheel. The brake caliper 100 includes the brake disk 101, the two brake pads 102 and 103, an electric actuator 104 that operates the brake pad 102, and a housing 120.

The electric actuator 104 includes a motor (not illustrated) that generates rotary motion, a speed reduction device 110 that decelerates the rotary motion, and a ball screw device 1 that converts the rotary motion into linear motion. In the following description, a direction parallel to a shaft center O1 of a screw shaft 2 of the ball screw device 1 is referred to as an axial direction. In addition, in the axial direction, a side on which the brake disk 101 is arranged as viewed from the ball screw device 1 is referred to as a first direction X1, and a direction opposite to the first direction X1 is referred to as a second direction X2.

The speed reduction device 110 is a planetary gear mechanism. The speed reduction device 110 includes an input shaft 111, a sun gear 112, a ring gear 113, a plurality of planetary gears 114, a plurality of transmission shafts 115, and a carrier 116.

The rotary motion of the motor is input to the input shaft 111. The input shaft 111 extends in the axial direction. In addition, a shaft center O2 of the input shaft 111 is located on an extension line of the shaft center O1. The sun gear 112 is penetrated by the input shaft 111 and is non-rotatably fixed to the input shaft 111. The ring gear 113 is an internal gear centered on the shaft center O2. An outer peripheral surface of the ring gear 113 is fitted into the housing 120. Thus, the ring gear 113 is unrotatably fixed to the housing 120.

The planetary gear 114 is arranged between the sun gear 112 and the ring gear 113, and is meshed with the sun gear 112 and the ring gear 113. The planetary gear 114 is penetrated by the transmission shaft 115. Furthermore, the planetary gear 114 is rotatably supported around the transmission shaft 115.

The carrier 116 is a ring-shaped component centered on the shaft center O1. An outer peripheral surface of the carrier 116 is fitted into a bearing 117. Thus, the carrier 116 is rotatably supported by the housing 120. The screw shaft 2 penetrates a central portion of the carrier 116. The carrier 116 and the screw shaft 2 are spline-fitted (not illustrated). Thus, the carrier 116 and the screw shaft 2 are coupled in such a manner as not to rotate relatively. In addition, the transmission shaft 115 penetrates a position eccentric to the outer side in the radial direction from the central portion of the carrier 116.

From the above, when the rotary motion is input to the input shaft 111, the sun gear 112 rotates around the shaft center O2. Then, the planetary gear 114 rotates (revolves) around the shaft center O2 while rotating (rotating) around the transmission shaft 115. As a result, the carrier 116 and the screw shaft rotate around the shaft center O1. In addition, a rotational speed of the screw shaft 2 is decelerated more than a rotational speed of the input shaft 111.

The ball screw device 1 includes the screw shaft 2, a nut 3, and a ball 4 (not illustrated in FIG. 1) (see FIG. 4), and a plurality of deflectors 5 (only one is illustrated in FIG. 1). The screw shaft 2 includes a shaft portion 10 fitted into the carrier 116, and a screw shaft main body 11 arranged in the first direction X1 with respect to the shaft portion 10. An outer peripheral surface of the screw shaft main body 11 is provided with a spiral outer peripheral raceway surface 13, and a plurality of recess portions 14 (only one is illustrated in FIG. 1) recessed to an inner side in the radial direction.

The nut 3 has a bottomed cylindrical shape. That is, the nut 3 includes a cylindrical nut main body 6, and a lid portion 7 that closes an opening of the nut main body 6. An inner peripheral raceway surface 6a facing the outer peripheral raceway surface 13 is provided on an inner peripheral surface of the nut main body 6. A spiral raceway 8 is formed between the outer peripheral raceway surface 13 and the inner peripheral raceway surface 6a. A plurality of the balls 4 is arranged on the raceway 8. Hereinafter, a direction in which the balls 4 roll along the raceway 8 is referred to as a spiral direction.

An outer peripheral surface 6b of the nut main body 6 has a circular shape centered on the shaft center O1. The outer peripheral surface 6b of the nut main body 6 abuts on a support surface 121 of the housing 120. The outer peripheral surface 6b of the nut main body 6 is supported slidably in the axial direction with respect to the support surface 121. A rotation preventing member (not illustrated) is provided on the outer peripheral surface 6b of the nut main body 6. The rotation preventing member regulates the nut 3 in such a manner as not to rotate around the shaft center O1.

Note that the support surface 121 of the housing 120 has a circular shape. In addition, a minute gap is provided between the support surface 121 and the outer peripheral surface 6b of the nut main body 6 in such a manner that the nut 3 is slidable.

The lid portion 7 closes an internal space of the nut main body 6 in the first direction X1. In addition, a length of the outer peripheral surface 6b of the nut main body 6 in the axial direction is longer than that of the outer peripheral raceway surface 13. Thus, liquid and dust hardly enter the internal space of the nut main body 6 from a side of the brake disk 101. Furthermore, the brake pad 102 is in contact with a surface 7a, which faces the first direction X1, of the lid portion 7.

From the above, when the nut 3 moves in the first direction X1 by the rotation of the screw shaft 2, the brake pad 102 moves in the first direction X1. The brake pad 102 presses the brake disk 101 in the first direction X1, and the brake disk 101 comes into contact with the brake pad 103. As a result, the brake disk 101 is sandwiched and held between the brake pads 102 and 103, and the rotation of the wheel (not illustrated) is regulated. In addition, a length of the inner peripheral raceway surface 6a of the nut main body 6 in the axial direction is longer than that of the outer peripheral raceway surface 13. A movement amount of the nut 3 in the first direction X1 increases when the brake pad 102 wears. Then, there is a possibility that the inner peripheral raceway surface 6a does not face the outer peripheral raceway surface 13 and the balls 4 fall off the raceway 8. Thus, in the present embodiment, the length of the inner peripheral raceway surface 6a in the axial direction is set to such a length with which the inner peripheral raceway surface 6a keeps facing the outer peripheral raceway surface 13 at all times and the balls 4 do not fall off the raceway 8 even when the movement amount of the nut 3 in the first direction X1 increases.

The deflectors 5 are circulation devices that return the balls 4 moved by one lead in the raceway 8 by one lead. One of the deflectors 5 is inserted into one of the recess portions 14 of the screw shaft 2. In addition, a bottom surface 5a of the deflector 5 abuts on a bottom surface 14a of the recess portion 14 (see FIG. 4). Note that the bottom surface 5a and the bottom surface 14a are flat surfaces. The plurality of deflectors 5 (plurality of recess portions 14) is arranged in different directions in such a manner as not to overlap with each other in the axial direction when viewed from the shaft center O1. As a result, a load acting on the screw shaft 2 from the nut 3 via the balls 4 is evenly distributed in a circumferential direction. Note that it is more preferable that the plurality of deflectors 5 is arranged at equal intervals in the circumferential direction.

Figure 2:
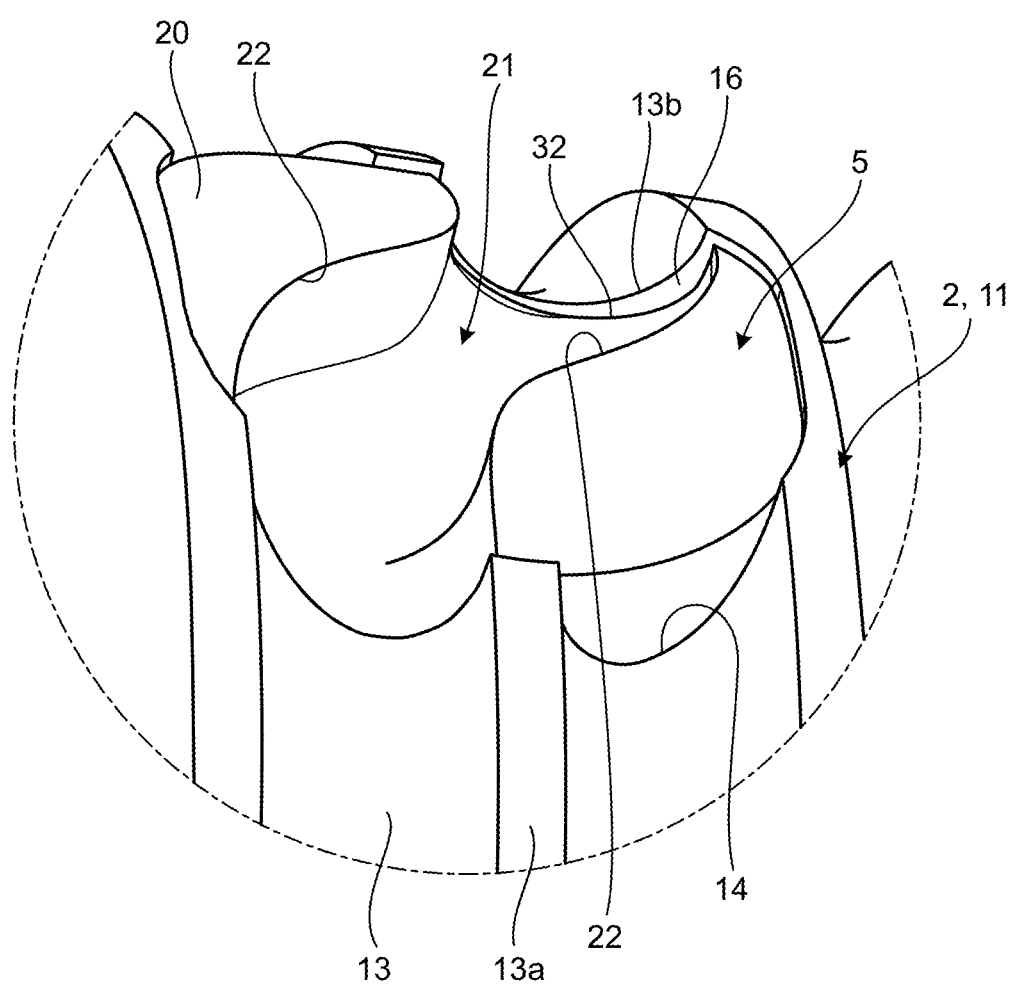
FIG. 2 is a perspective view of a deflector and a recess portion of a ball screw device of the first embodiment in a perspective manner.

FIG. 2 is a perspective view of the deflector and the recess portion of the ball screw device of the first embodiment in a perspective manner. As illustrated in FIG. 2, each of the deflectors 5 has an outer side surface 20 that faces the outer side in the radial direction. This outer side surface 20 faces the inner peripheral raceway surface 6a of the nut 3. The outer side surface 20 of the deflector 5 is provided with an S-shaped groove surface 21 recessed to the inner side on the radial side. The S-shaped groove surface 21 is a groove surface that returns the balls 4 by one lead, and has an S-shape when viewed from the outer side in the radial direction. In addition, the S-shaped groove surface 21 is provided with two tangs 22. Each of these tangs 22 is a guide (protrusion) to cause the balls 4 that enter the S-shaped groove surface 21 to sink to the inner side in the radial direction. Next, details of the recess portion 14 and the deflector 5 of the present embodiment will be described.

Figure 3:
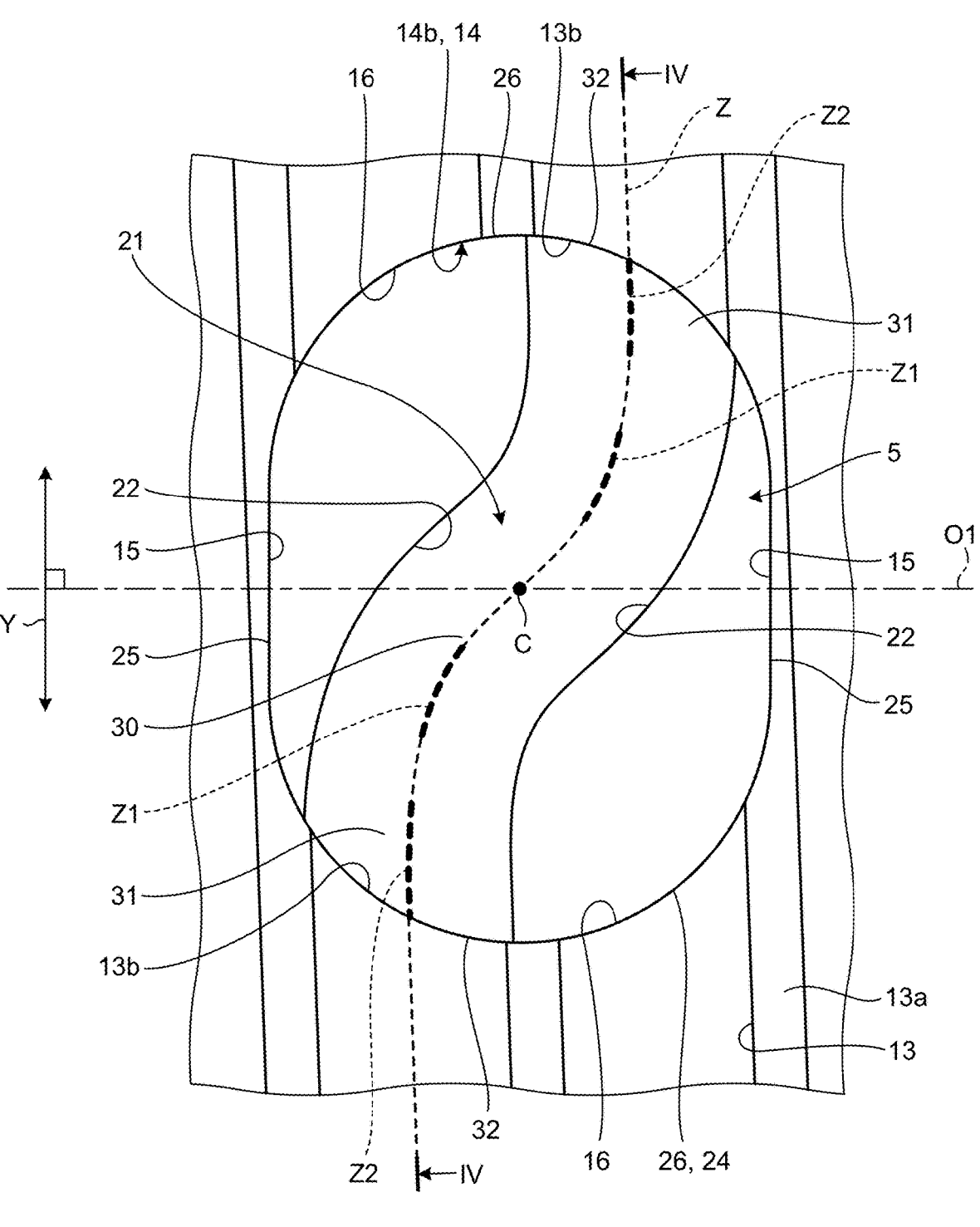
FIG. 3 is an enlarged view of the recess portion and the deflector of the first embodiment as viewed from an outer side in a radial direction.

FIG. 3 is an enlarged view of the recess portion and the deflector of the first embodiment as viewed from the outer side in the radial direction. Hereinafter, as illustrated in FIG. 3, a direction orthogonal to the shaft center O1 when viewed from the outer side in the radial direction is referred to as an intersection direction Y. As illustrated in FIG. 3, the recess portion 14 has an inner peripheral surface 14*b*. The inner peripheral surface 14*b* has a pair of first facing surfaces 15 and 15, and a pair of second facing surfaces 16 and 16. The first facing surfaces 15 are surfaces extending in the intersection direction Y. The pair of first facing surfaces 15 and 15 faces each other in the axial direction. Each of the pair of first facing surfaces 15 and 15 has a linear shape in the intersection direction Y when viewed from the outer side in the radial direction. Note that since also extending in the circumferential direction around the shaft center O1, the pair of first facing surfaces 15 and 15 may be referred to as a pair of first peripheral surfaces.

The second facing surfaces 16 are surfaces extending in the axial direction. The pair of second facing surfaces 16 and 16 faces each other in the intersection direction Y. The pair of second facing surfaces 16 and 16 is arranged between the pair of first facing surfaces 15 and 15. Each of the pair of second facing surfaces 16 and 16 has an arc shape when viewed from the outer side in the radial direction, and a central portion of the second facing surface 16 protrudes to the outer side in the intersection direction Y.

The deflector 5 is a component formed point-symmetrically with respect to a center C (see FIG. 3). The deflector 5 has an outer peripheral surface 24. The outer peripheral surface 24 has a pair of first side surfaces 25 and 25 facing the pair of first facing surfaces 15 and 15, and a pair of second side surfaces 26 and 26 facing the pair of second facing surfaces 16 and 16. An outer shape (outer peripheral surface 24) of the deflector 5 is the same as an inner shape (inner peripheral surface 14*b*) of the recess portion 14. Thus, the first side surfaces 25 linearly extend in the intersection direction Y similarly to the first facing surfaces 15. The second side surfaces 26 extend in the axial direction similarly to the second facing surfaces 16. In addition, each of the second side surfaces 26 has an arc shape similarly to the second facing surfaces 16, and a central portion of the second side surface 26 protrudes to the outer side in the intersection direction Y. Note that since also extending in the circumferential direction around the shaft center O1, the pair of first side surfaces 25 and 25 may be referred to as a pair of second peripheral surfaces.

As described above, the recess portion 14 and the deflector 5 of the first embodiment have a so-called oval shape when viewed from the outer side in the radial direction. In addition, a length of the recess portion 14 and the deflector 5 in the intersection direction Y is longer than a length thereof in the axial direction.

The outer peripheral surface 24 of the deflector 5 has interference with respect to the inner peripheral surface 14*b* of the recess portion 14. In other words, the outer shape (outer peripheral surface 24) of the deflector 5 before assembly bulges to the outer side compared to the inner shape (inner peripheral surface 14*b*) of the recess portion 14. Thus, the deflector 5 is fitted into the recess portion 14.

In addition, a portion having the interference is the pair of first side surfaces 25 and 25 of the outer peripheral surface 24 of the deflector 5, and the interference is not provided in the pair of second side surfaces 26 and 26. Thus, the pair of first side surfaces 25 and 25 of the deflector 5 receives a compressive load from the pair of first facing surfaces 15 and 15 of the recess portion 14. On the other hand, the pair of second side surfaces 26 and 26 of the deflector 5 receives no load from the pair of second facing surfaces 16 and 16 of the recess portion 14.

Hereinafter, a direction in which the S-shaped groove surface extends (direction along a virtual line Z passing through a central portion in the axial direction of the S-shaped groove surface 21 in FIG. 3) is referred to as an S-shaped direction. The S-shaped groove surface 21 includes a central groove surface 30 located at the central portion of the S-shaped groove surface 21 in the S-shaped direction, and two entrance/exit groove surfaces 31 located on both sides of the S-shaped groove surface 21 in the S-shaped direction.

Figure 4:
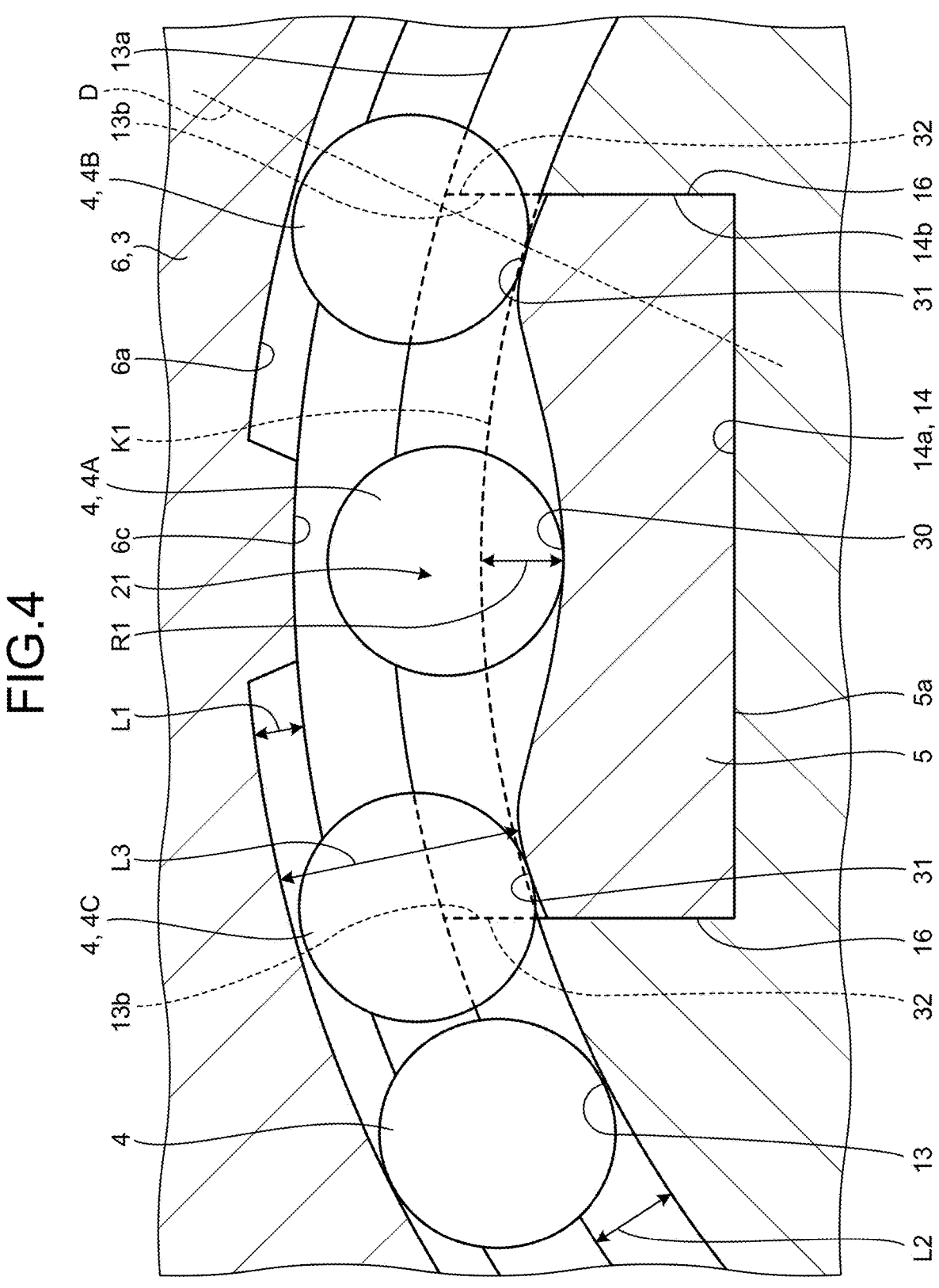
FIG. 4 is a cross-sectional view schematically illustrating a cross section taken along a center of an S-shaped groove surface.

FIG. 4 is a cross-sectional view schematically illustrating a cross section taken along the center of the S-shaped groove surface. A virtual line K1 illustrated in FIG. 4 is a line obtained by extension of the outer peripheral raceway surface 13 in the circumferential direction. In addition, in FIG. 4, only a part of the plurality of balls 4 is illustrated in order to make it easy to see the S-shaped groove surface 21. As illustrated in FIG. 4, the central groove surface 30 is located on the inner side in the radial direction of the virtual line K1. In addition, the central groove surface 30 is inclined in such a manner as to be located on the inner side in the radial direction toward the central portion in the S-shaped direction, and has a recessed shape.

Although not illustrated in FIG. 4, the tangs 22 are provided on side surfaces of the central groove surface 30. Thus, the balls 4 moved from the entrance/exit groove surface 31 to the central groove surface 30 sinks by being guided by the tangs 22. Thus, the balls 4 move in the S-shaped direction while rolling on the central groove surface 30 (see a ball 4A among the balls 4 illustrated in FIG. 4). In addition, since the balls 4 move to the inner side in the radial direction, contact with a screw thread 6*c* of the inner peripheral raceway surface 6*a* of the nut 3 is avoided. Note that a movement amount in the radial direction of a case where the balls 4 roll on the S-shaped groove surface 21 (central groove surface 30) is R1.

In addition, as illustrated in FIG. 4, a height L1 of the screw thread 6*c* of the inner peripheral raceway surface 6*a* is lower than a height 12 of a screw thread 13*a* of the outer peripheral raceway surface 13. That is, the screw thread 13*a* of the outer peripheral raceway surface 13 is higher. Thus, the balls 4 hardly ride on a groove shoulder of the outer peripheral raceway surface 13.

As illustrated in FIG. 3, the length in the intersection direction Y is longer than the length in the axial direction in the deflector 5 as described above. Thus, the length of the central groove surface 30 in the intersection direction is relatively long. As a result, the central groove surface 30 has a gentle S-shaped curve (see a portion of a virtual line Z1 in the virtual line Z in FIG. 3) as viewed in the radial direction. Thus, the balls 4 smoothly roll on the central groove surface 30.

Each of the entrance/exit groove surfaces 31 is a groove surface continuous with the outer peripheral raceway surface 13. As illustrated in FIG. 3, a portion of the entrance/exit groove surface 31 which portion is close to an end in the S-shaped direction (see a portion Z2 in the virtual line Z in FIG. 3) extends in parallel with the outer peripheral raceway surface 13. Thus, the balls 4 smoothly enter the entrance/exit groove surface 31 from the outer peripheral raceway surface 13.

No tang 22 is provided in the entrance/exit groove surfaces 31. That is, as illustrated in FIG. 4, the balls 4 rolling on the entrance/exit groove surfaces 31 do not sink to the inner side in the radial direction (see balls 4B and 4C among the balls 4 illustrated in FIG. 4). Thus, the balls 4 rolling on the entrance/exit groove surfaces 31 can abut on the inner peripheral raceway surface 6a.

Furthermore, the entrance/exit groove surfaces 31 are located on the inner side in the radial direction of the virtual line K1. That is, the entrance/exit groove surfaces 31 are located on the inner side in the radial direction of the outer peripheral raceway surface 13. Thus, the load acting on the screw shaft 2 from the nut 3 does not act on the entrance/exit groove surfaces 31, or the load acting on the entrance/exit groove surfaces 31 is decreased. Thus, the deformation of the deflector 5 is controlled. Note that in a case where a distance L3 between each of the entrance/exit groove surfaces 31 and the inner peripheral raceway surface 6a is longer than a diameter of the balls 4, the load acting on the screw shaft 2 from the nut 3 does not act on the entrance/exit groove surfaces 31.

Figure 5:
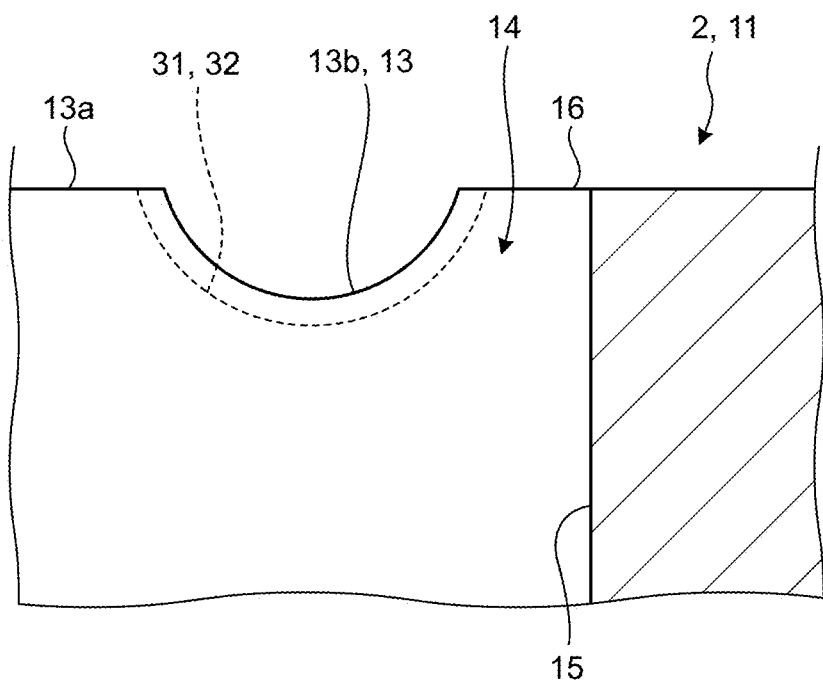
FIG. 5 is a view of an opening in an outer peripheral raceway surface provided in a second facing surface of the recess portion (screw shaft-side opening) as viewed from the recess portion.

FIG. 5 is a view of an opening (screw shaft-side opening) in an outer peripheral raceway surface provided in each of the second facing surfaces of the recess portion as viewed from the recess portion. As illustrated in FIG. 5, a screw shaft-side opening 13b of the outer peripheral raceway surface 13 is provided in each of the second facing surfaces 16 of the inner peripheral surface 14b of the recess portion 14. Furthermore, a deflector-side opening 32 of the entrance/ exit groove surface 31 is provided in each of the second side surfaces 26 of the outer peripheral surface 24 of the deflector 5 (see FIG. 2 and the like). The screw shaft-side opening 13b and the deflector-side opening 32 are adjacent to each other in a rolling direction of the balls 4 (S-shaped direction). In addition, when viewed in the rolling direction of the balls 4, a groove shape of the entrance/exit groove surfaces 31 is larger than a groove shape of the outer peripheral raceway surface 13. Thus, when viewed in the rolling direction of the balls 4, s groove shape of the deflector-side opening 32 is also larger than a groove shape of the screw shaft-side opening 13b. That is, the groove shape of the deflector-side opening 32 is larger in depth and in groove width than the groove shape of the screw shaft-side opening 13b. Thus, the screw shaft-side opening 13b is located on the inner side of the deflector-side opening 32.

Next, an effect of the ball screw device 1 of the first embodiment will be described. As illustrated in FIG. 3, the recess portion 14 and the deflector 5 have a so-called oval shape when viewed from the outer side in the radial direction. That is, the recess portion 14 and the deflector 5 are not circular. Thus, the S-shaped groove surface 21 and the outer peripheral raceway surface 13 are continuous only when the deflector 5 is inserted into the recess portion 14. Thus, when the deflector 5 is assembled to the recess portion 14, work of setting a direction of the deflector 5 becomes unnecessary.

In addition, the deflector 5 is fitted into the recess portion 14, and hardly moves to the outer side in the radial direction. In addition, as illustrated in FIG. 4, the balls 4B and 4C rolling on the entrance/exit groove surfaces 31 can abut on the inner peripheral raceway surface 6a. Thus, the balls 4B and 4C regulate movement of the deflector 5 to the outer side in the radial direction. From the above, the deflector 5 is not detached from the recess portion 14.

In addition, a compressive load from the inner peripheral surface 14b of the recess portion 14 acts on the outer peripheral surface 24 of the deflector 5 fitted in the recess portion 14. When the load acting on the outer peripheral surface 24 of the deflector 5 increases, the deflector 5 is deformed. Then, the S-shaped groove surface 21 is distorted, and the balls 4 cannot smoothly roll on the S-shaped groove surface 21. On the other hand, in the deflector 5 of the first embodiment, the portion having the interference is limited to a part (only the pair of first side surfaces 25 and 25) of the outer peripheral surface 24. That is, the load acting on the deflector 5 from the recess portion 14 is limited not to be excessive. As a result, the deformation of the deflector 5 is controlled.

In addition, the portion having the interference is not the pair of second side surfaces 26 and 26 but the pair of first side surfaces 25 and 25. When the portion where the interference is provided is a linear portion, production thereof is easy, and measurement of an interference amount is also easy. Thus, according to the present embodiment, it is easy to manage the interference.

In addition, as illustrated in FIG. 4, the entrance/exit groove surfaces 31 are located on the inner side in the radial direction of the outer peripheral raceway surface 13. As a result, the load acting on the screw shaft 2 from the nut 3 does not act on the entrance/exit groove surfaces 31, or the load acting on the entrance/exit groove surfaces 31 is decreased. As a result, the deformation of the deflector 5 is controlled.

Figure 6:
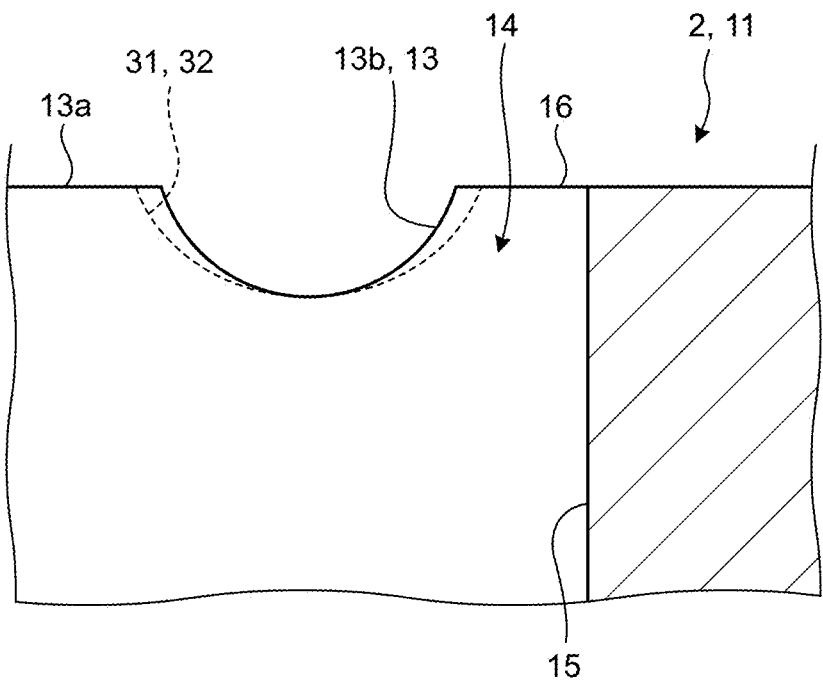
FIG. 6 is a view illustrating a state in which the deflector moves to the outer side in the radial direction from the state of FIG. 5.

FIG. 6 is a view illustrating a state in which the deflector moves to the outer side in the radial direction from the state of FIG. 5. As illustrated in FIG. 5, when viewed in the rolling direction of the balls 4, the groove shape of the deflector-side opening 32 is larger than the groove shape of the screw shaft-side opening 13b. Thus, as illustrated in FIG. 6, even when the deflector 5 is displaced to the outer side in the radial direction, the deflector-side opening 32 does not move to the inner side of the screw shaft-side opening 13b. That is, an edge of the deflector-side opening 32 is prevented from moving to the inner side of the screw shaft-side opening 13b and coming into contact with the balls 4.

In addition, according to the ball screw device 1 of the first embodiment, a movement amount R1 in the radial direction of the balls 4 on the S-shaped groove surface 21 is smaller than a movement amount in the radial direction of a case where the deflector 5 is provided in the nut 3. Hereinafter, a specific description will be given.

Figure 7:
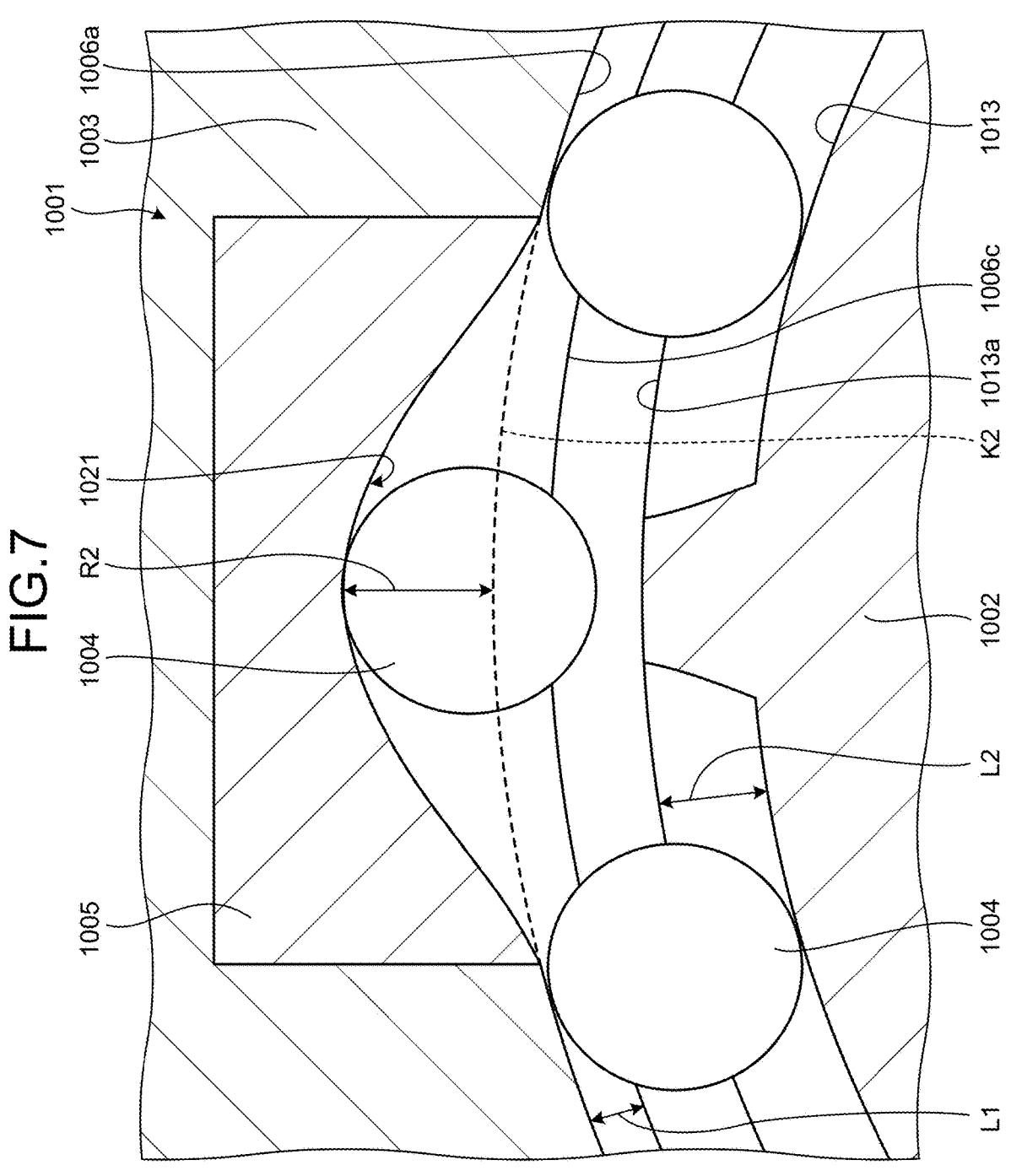
FIG. 7 is a schematic view schematically illustrating a cross section of a ball screw device of a first comparative example, the cross section being taken along an S-shaped groove surface.

FIG. 7 is a schematic view schematically illustrating a cross section of a ball screw device of a first comparative example, the cross section being taken along an S-shaped groove surface. As illustrated in FIG. 7, with respect to a ball screw device 1001 of the first comparative example, a height of a screw thread 1013a of an outer peripheral raceway surface 1013 of a screw shaft 1002 is 12 that is the same as that of the first embodiment. In addition, in a nut 1003, a height of a screw thread 1006c of an inner peripheral raceway surface 1006a is L1 that is the same as that of the first embodiment. Note that a virtual line K2 in FIG. 7 is a line obtained by extension of the inner peripheral raceway surface 1006a in a circumferential direction.

In a case where balls 1004 move on an S-shaped groove surface 1021 of a deflector 1005, a movement amount of the balls 1004 in a radial direction is R2. The movement amount R2 in the radial direction is a movement amount by which the balls 1004 exceed a height L2 of the screw thread 1013a of the outer peripheral raceway surface 1013 in order to avoid a contact with the screw thread 1013*a*. In addition, in the inner peripheral raceway surface 1006*a* of the first comparative example, a height of the screw thread 1006*c* is L1 and is low. Thus, a bottom portion of the inner peripheral raceway surface 1006*a* is shallow, and a step amount between the bottom portion of the inner peripheral raceway surface 1006*a* and the deepest portion of the S-shaped groove surface 1021 is large. That is, according to the first comparative example, the movement amount R2 by which the balls 1004 move in the radial direction is large.

On the other hand, as illustrated in FIG. 4, in the outer peripheral raceway surface 13 of the present embodiment, the height of the screw thread 13*a* is 12 and is high. Thus, a bottom portion of the outer peripheral raceway surface 13 is deep, and a step amount between the bottom portion of the outer peripheral raceway surface 13 and the deepest portion of the S-shaped groove surface 21 is small. That is, according to the present embodiment, the movement amount R1 by which the balls 4 move in the radial direction is smaller than the movement amount R2 of the first comparative example.

From the above, the S-shaped groove surface 1021 of the first comparative example has the large step amount (movement amount in the radial direction). On the other hand, in the S-shaped groove surface 21 of the present embodiment, the step amount is small, the inclination in the depth direction (radial direction) of the S-shaped groove surface 21 is gentle, and flatness is secured. Thus, the balls 4 rolling on the S-shaped groove surface 21 move smoothly.

Figure 8A:
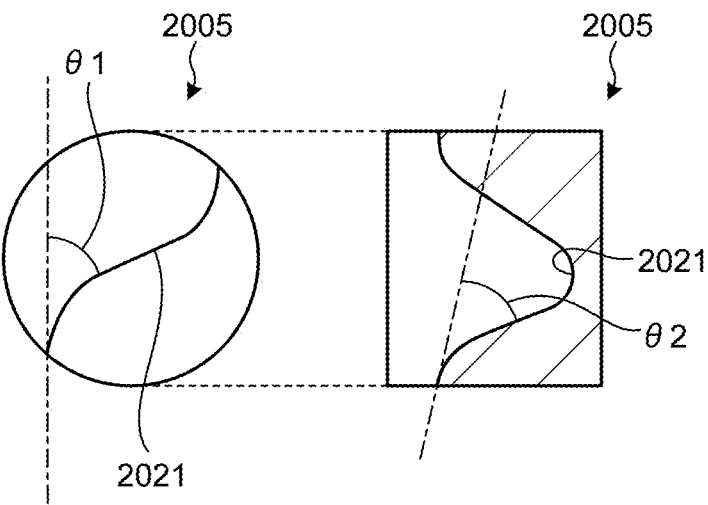
FIG. 8A is a view illustrating a deflector of a second comparative example in an abstract manner.
Figure 8B:
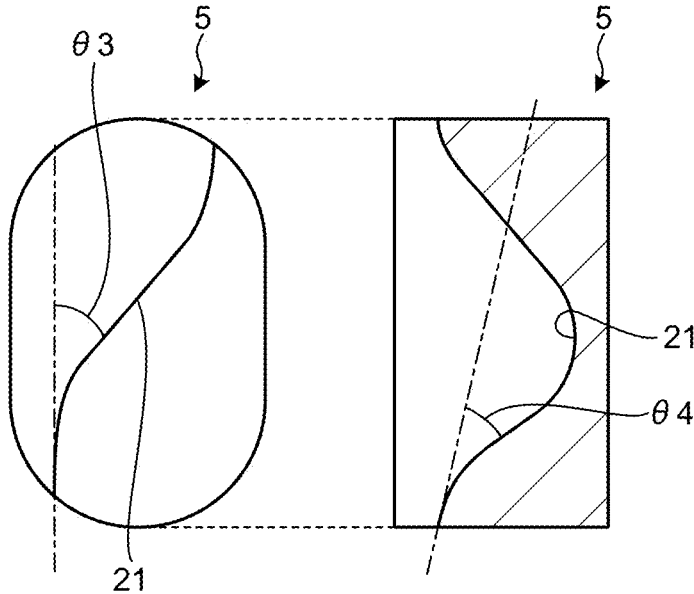
FIG. 8B is a view illustrating the deflector of the first embodiment in an abstract manner.

FIG. 8A is a view illustrating a deflector of a second comparative example in an abstract manner. FIG. 8B is a view illustrating a deflector of the first embodiment in an abstract manner. A deflector 2005 of the second comparative example illustrated in FIG. 8A has a circular outer shape. According to the deflector 2005 of the second comparative example, an angle at which balls turn in an axial direction along an S-shaped groove surface 2021 is θ1 and is relatively large. In addition, according to the deflector 2005 of the second comparative example, an angle at which the balls turn in a radial direction along the S-shaped groove surface 2021 is θ2 and is relatively large. On the other hand, the deflector 5 of the present embodiment is longer in the intersection direction than in the axial direction. Thus, as illustrated in FIG. 8B, an angle θ3 at which the balls turn in the axial direction along the S-shaped groove surface 21 is small, and the inclination is gentler than that in the second comparative example. In addition, an angle θ4 at which the balls turn in the radial direction along the S-shaped groove surface 21 is small, and the inclination is gentler than that in the second comparative example. Thus, according to the first embodiment, the balls 4 smoothly roll on the S-shaped groove surface 21.

In addition, in the present embodiment, the nut main body 6 and the lid portion 7 are integrated. Thus, the nut 3 has a function of a piston, and the brake pad 102 can be pressed by the lid portion 7. Thus, the number of components can be reduced. In addition, in a case where a nut and a piston are separate components, it is necessary to externally fit the piston to the nut, and a ball screw device becomes large. On the other hand, according to the first embodiment, it is not necessary to externally fit the piston to the nut, and the ball screw device is downsized. In addition, the nut 3 is not provided with a through hole to house the deflector 5. Thus, sealability of the nut 3 is high, and liquid and dust hardly enter the inside of the nut 3.

As described above, the ball screw device 1 of the first embodiment includes the screw shaft 2 in which the outer peripheral raceway surface 13 is provided in the outer peripheral surface, the nut 3 in which the screw shaft 2 is inserted and the inner peripheral raceway surface 6*a* is provided in the inner peripheral surface, the plurality of balls 4 arranged in the raceway 8 between the outer peripheral raceway surface 13 and the inner peripheral raceway surface 6*a*, and the at least one deflector 5 in which the S-shaped groove surface 21 to circulate the balls 4 is provided. The outer peripheral surface of the screw shaft 2 is provided with the plurality of recess portions 14 that is recessed to the inner side in the radial direction and houses the deflectors 5. The inner peripheral surfaces 14*b* of the recess portions 14 and the outer peripheral surfaces 24 of the deflectors 5 are not circular when viewed from the outer side in the radial direction of the screw shaft 2.

According to the present embodiment, labor for the work of assembling the deflectors 5 is reduced.

In addition, in the first embodiment, the height of the screw thread 13*a* on the outer peripheral raceway surface 13 is higher than the height of the screw thread 6*c* on the inner peripheral raceway surface 6*a*.

As a result, the balls 4 hardly ride on the groove shoulder of the outer peripheral raceway surface 13. In addition, the inclination of the S-shaped groove surface 21 in the radial direction becomes gentle, and the balls 4 rolling on the S-shaped groove surface 21 move smoothly.

In addition, in the first embodiment, when viewed from the outer side in the radial direction of the screw shaft 2, the length of the recess portions 14 and the deflectors 5 in the intersection direction Y intersecting with the axial direction is longer than the length thereof in the axial direction parallel to the screw shaft 2.

Accordingly, the inclination of the S-shaped groove surface 21 becomes gentle, and the balls 4 rolling on the S-shaped groove surface 21 move smoothly.

In addition, the outer peripheral surfaces 24 of the deflectors 5 in the first embodiment have the interference with respect to the inner peripheral surfaces 14*b* of the recessed portions 14.

Accordingly, the deflectors 5 are fitted into the recess portions 14, and are hardly detached from the recess portions 14.

In addition, the inner peripheral surface 14*b* of each of the recess portions 14 of the first embodiment has the pair of first facing surfaces 15 and 15 facing each other, and the pair of second facing surfaces 16 and 16 facing each other and arranged between the pair of first facing surfaces 15 and 15. The outer peripheral surface 24 of each of the deflectors 5 has the pair of first side surfaces 25 and 25 facing the pair of first facing surfaces 15 and 15, and the pair of second side surfaces 26 and 26 facing the pair of second facing surfaces 16 and 16. The pair of first facing surfaces 15 and 15 and the pair of first side surfaces 25 and 25 are linear when viewed from the outer side in the radial direction. The pair of second facing surfaces 16 and 16 and the pair of second side surfaces 26 and 26 have an arc shape when viewed from the outer side in the radial direction. The pair of first side surfaces 25 and 25 has the interference with respect to the pair of first facing surfaces 15 and 15.

From the above, the portion having the interference is limited to a part of the outer peripheral surface 24 of the deflector 5. Thus, the load acting on the deflector 5 from the recess portion 14 is decreased, and the deformation of the deflector 5 is controlled. In addition, the portions provided with the interference are the linear first side surfaces 25 in which the interference is easily managed. Thus, the deflector 5 is easily manufactured.

In addition, the S-shaped groove surface 21 of the first embodiment includes the central groove surface 30 in which the balls 4 sink to the inner side in the radial direction, and two entrance/exit groove surfaces 31 provided on the both sides of the central groove surface 30 and through which the balls 4 enter and exit.

From the above, even when a load on the outer side in the radial direction acts on the deflector 5, the entrance/exit groove surfaces 31 abut on the balls 4 abutting on the inner peripheral raceway surface 6a, and movement to the outer side in the radial direction is regulated. Thus, the deflector 5 is not detached from the recess portion 14.

In addition, the screw shaft-side opening 13b of the outer peripheral raceway surface 13 is provided in the inner peripheral surface 14b of the recess portion 14 of the first embodiment. A deflector-side opening 32 of the S-shaped groove surface 21 is provided in the outer peripheral surface 24 of the deflector 5. The groove shape of the deflector-side opening 31a-32 is larger than the groove shape of the screw shaft-side opening 13b.

Even when the deflector 5 moves to the outer side in the radial direction, the edge of deflector-side opening 32 does not enter the inside of the screw shaft-side opening 13b. Thus, the edge of deflector-side opening 32 is not in contact with the balls 4.

In addition, the nut 3 of the first embodiment includes the nut main body 6 having the cylindrical shape and provided with the inner peripheral raceway surface 6a in the inner peripheral surface, and the lid portion 7 that seals one opening of the nut main body 6.

The nut 3 has a function of a piston, and the number of components can be reduced. In addition, in a case where the nut and the piston are separate components, the piston is externally fitted to the nut, and the size of the ball screw device increases. However, according to the present embodiment, it is not necessary to externally fit the piston to the nut, and the ball screw device is downsized.

Although the ball screw device of the first embodiment has been described above, the present disclosure is not limited to the ball screw device 1 described as the example in the first embodiment. For example, the ball screw device of the present disclosure may be applied to a device other than the electric actuator 104 or the brake caliper 100.

Furthermore, the inner peripheral surface 14b of the recess portion 14 and the outer peripheral surface 24 of the deflector 5 have the so-called oval shape in the first embodiment, the present disclosure may have any shape other than a circular shape. Thus, the inner peripheral surface 14b of the recess portion 14 and the outer peripheral surface 24 of the deflector 5 may have, for example, a quadrangular shape or an elliptical shape. In addition, although extending in the intersection direction Y, the pair of first facing surfaces 15 and 15 and the pair of first side surfaces 25 and 25 may extend in the spiral direction along the raceway 8. In addition, in a case where the recess portion 14 and the deflector 5 have the quadrangular shape, a rectangle, a square, a parallelogram, a rhombus, a trapezoid, and the like are included. Furthermore, a quadrangular corner portion may be an R portion, and is not specifically limited.

Furthermore, in the present disclosure, interference may be provided on a pair of second side surfaces 26 and 26 in a deflector 5. Alternatively, in a deflector 5, interference may be provided on both of a pair of first side surfaces 25 and 25 and a pair of second side surfaces 26 and 26.

Furthermore, in the present disclosure, an outer peripheral surface 24 of a deflector 5 may not have interference with respect to an inner peripheral surface 14b of a recess portion 14. That is, the deflector 5 may be loosely fitted into the recess portion 14. In a case where such a deflector 5 is used, an S-shaped groove surface 21 needs to have entrance/exit groove surfaces 31 in order to prevent the deflector 5 from being detached from the recess portion 14. Note that as in the first embodiment, in a case where the deflector 5 is long in the intersection direction Y, the length of the entrance/exit groove surfaces 31 is also secured to be long. Thus, the balls 4 always abut on at least one of the two entrance/exit groove surfaces 31, and detachment of the deflector 5 is avoided.

In addition, an S-shaped groove surface 21 of the present disclosure may include only a central groove surface 30 and may not include two entrance/exit groove surfaces 31.

Figure 9:
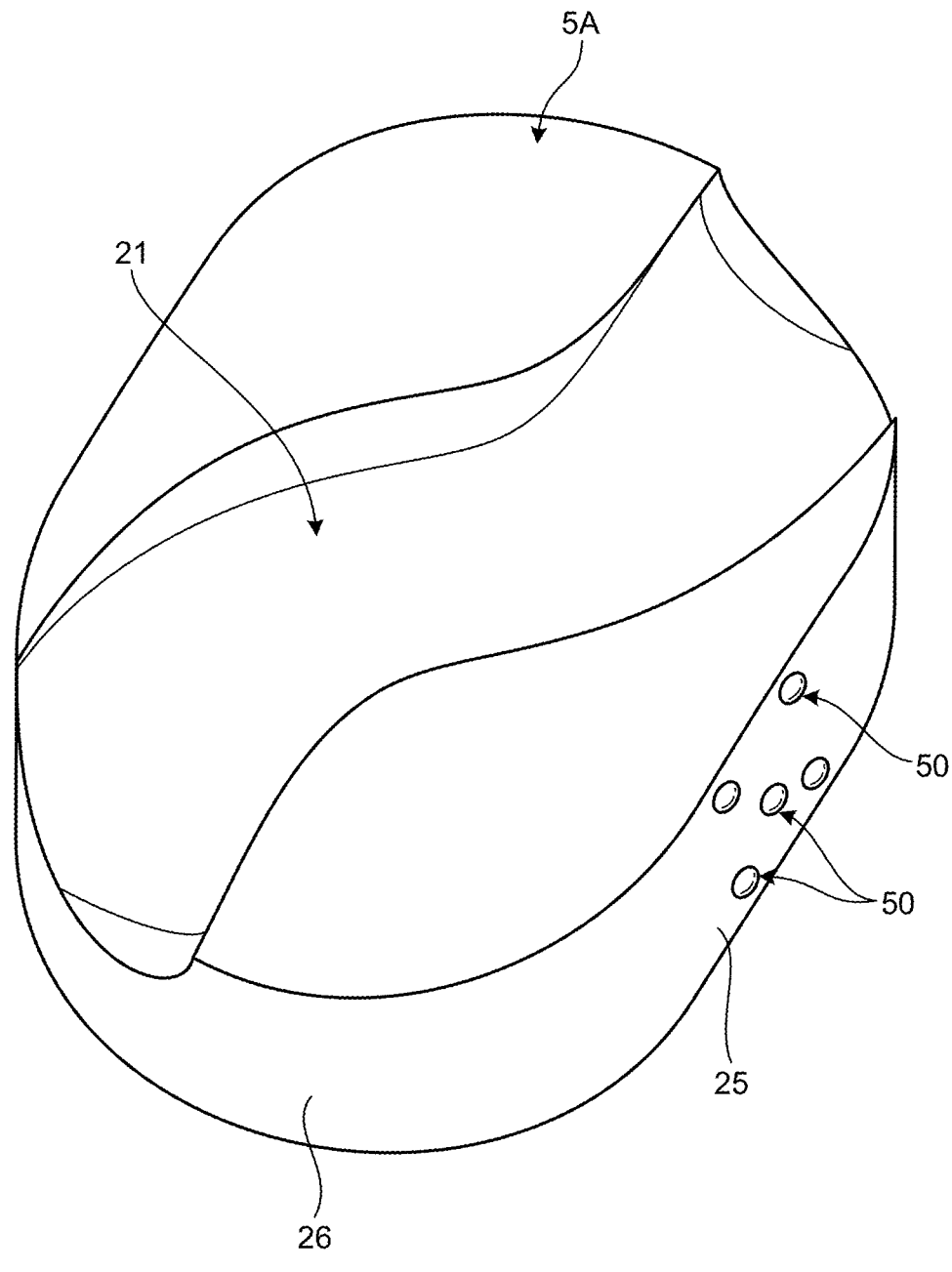
FIG. 9 is a perspective view of a deflector of a first modification example.
Figure 10:
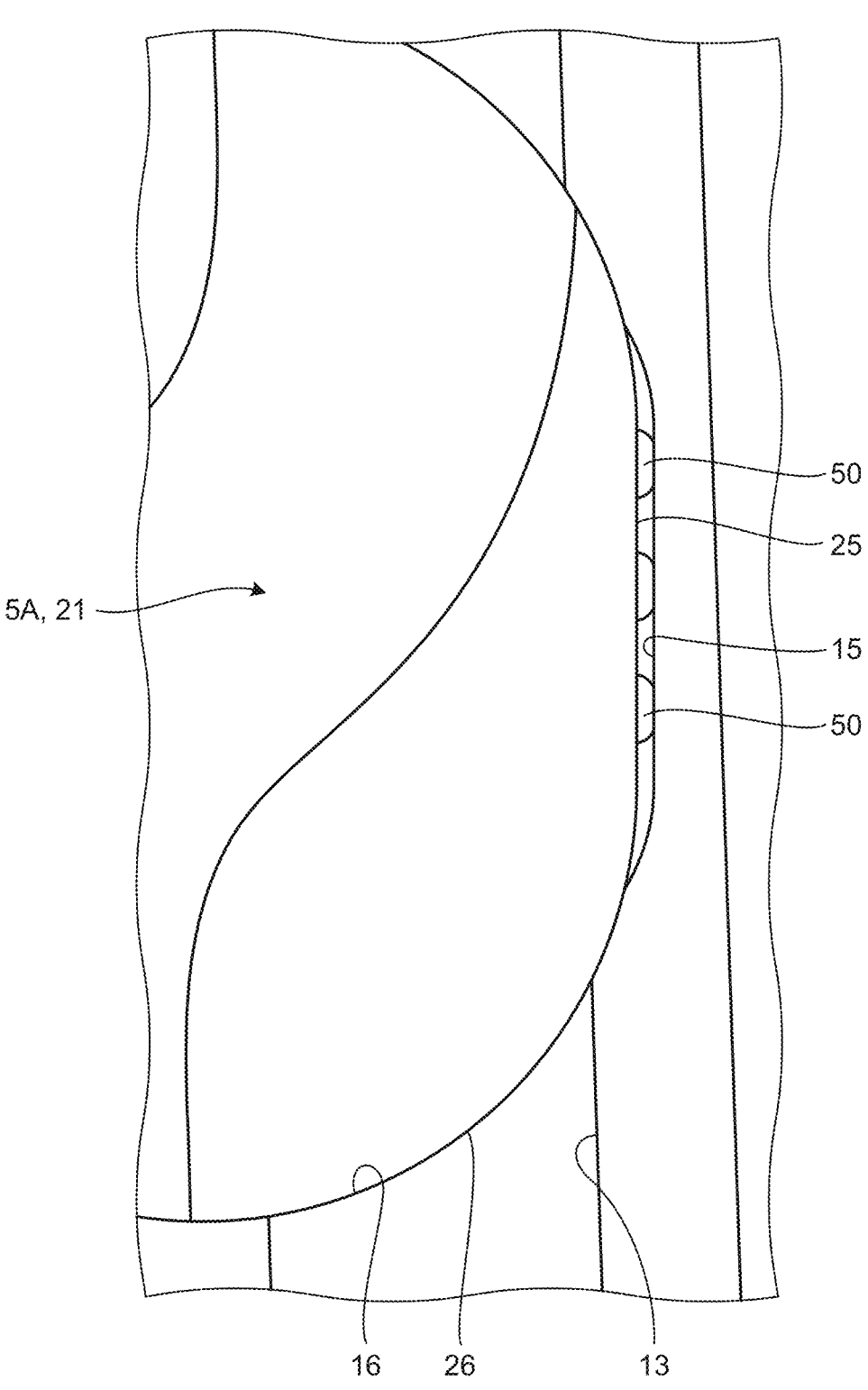
FIG. 10 is an enlarged view in which a part of a deflector fitted into a recess portion in the first modification example is enlarged.

FIG. 9 is a perspective view of a deflector according to a first modification example. FIG. 10 is an enlarged view in which a part of the deflector fitted into a recess portion in the first modification example is enlarged. The present disclosure may include a deflector 5A as illustrated in FIG. 9 and FIG. 10. The deflector 5A has at least one or more protrusions 50 protruding from an outer peripheral surface 24. Note that the outer peripheral surface 24 of the deflector 5A does not have interference. When the deflector 5A is inserted into a recess portion 14, the protrusion 50 is crushed between an inner peripheral surface 14b of the recess portion 14 and an outer peripheral surface 24 of the deflector 5A. Thus, the deflector 5A is fitted into the recess portion 14. Furthermore, the protrusion 50 is easily deformed since being small. That is, while the protrusion 50 is deformed, deformation of the deflector 5A is avoided. Thus, balls 4 rolling on an S-shaped groove surface 21 move smoothly.

In addition, in a case of being provided on the outer peripheral surface 24 of the deflector 5A, the protrusion 50 is preferably provided only on a pair of first side surfaces 25 and 25 as illustrated in FIG. 9. This is because a gap may be generated between a deflector-side opening 32 and a screw shaft-side opening 13b and the balls 4 may not roll smoothly when the protrusion 50 is provided on a pair of second side surfaces 26 and 26.

Furthermore, a height L1 of a screw thread 6c of an inner peripheral raceway surface 6a may be higher than or equal to a height L2 of a screw thread 13a of an outer peripheral raceway surface 13. In addition, the deflector 5 of the first embodiment is longer in the intersection direction Y than in the axial direction. However, a length of a deflector 5 may be longer in the axial direction in the present disclosure. This is because work of setting a direction of a deflector 5 can be made unnecessary when the deflector 5 is assembled to a recess portion 14 even in such a first modification example.

In addition, a nut 3 of the present disclosure may include only a nut main body 6 and may not include a lid portion 7. In addition, a bottom surface 5a (see FIG. 4) of a deflector 5 may not be a flat surface, and may have a recessed shape in which a central portion is recessed to the outer side in the radial direction and is not specifically limited. In addition, chamfering processing may be performed on both or one of a screw shaft-side opening 13b and a deflector-side opening 32, and an R portion or a corner R portion may be generated. In addition, a deflector 5 may not include a tang 22 in the present disclosure.

Figure 11:
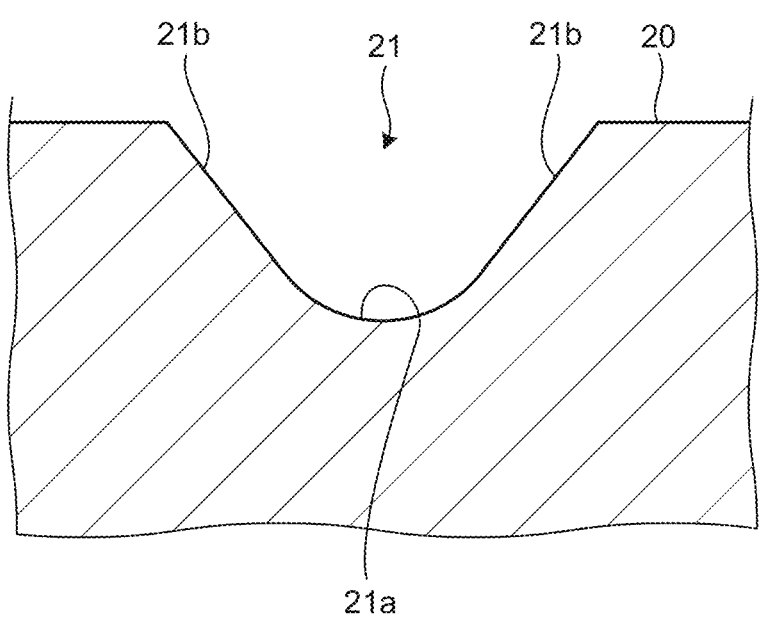
FIG. 11 is a cross-sectional view of a deflector of a second modification example.

FIG. 11 is a cross-sectional view of a deflector of a second modification example. Furthermore, a cross-sectional shape (groove shape) of an S-shaped groove surface 21 of a deflector 5 is not specifically limited in the present disclosure. For example, as illustrated in FIG. 11, a bottom portion 21a of the S-shaped groove surface 21 may have an arc shape, and a portion 21b near an outer side surface 20 may have a linear shape. With such a shape, the deflector 5 can be easily released from a mold after being molded. Next, a ball screw device of a second embodiment will be described. In the description of the second embodiment, only differences from the first embodiment will be described.

Second Embodiment

Figure 12:
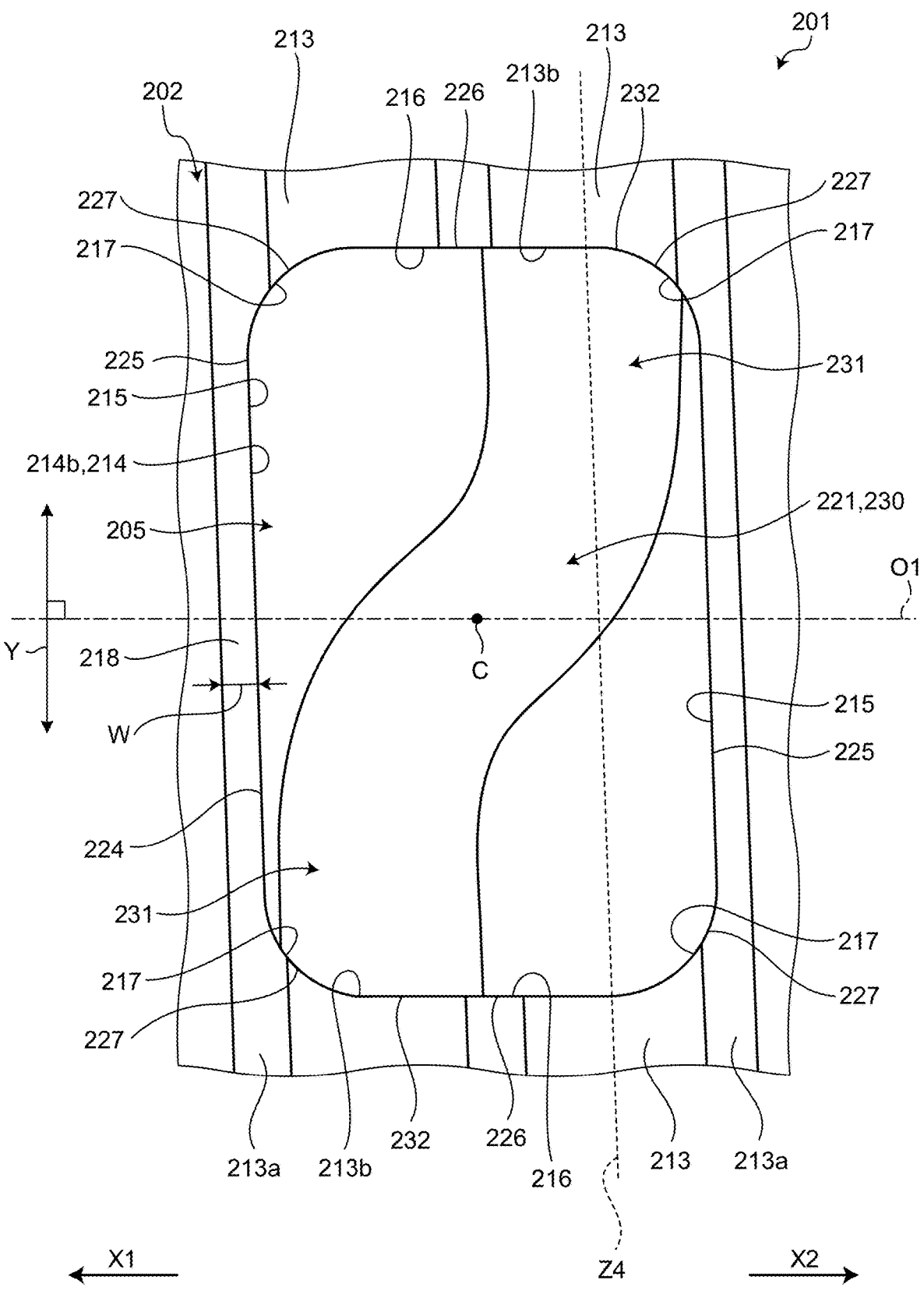
FIG. 12 is an enlarged view of a recess portion and a deflector of a second embodiment as viewed from an outer side in a radial direction.

FIG. 12 is an enlarged view of a recess portion and a deflector of the second embodiment as viewed from an outer side in a radial direction. As illustrated in FIG. 12, a ball screw device 201 of the second embodiment is different from the ball screw device 1 of the first embodiment in a point that a shape of a deflector 205 and a recess portion 214 viewed from the outer side in the radial direction is a parallelogram. Note that a virtual line Z4 in FIG. 12 extends in a spiral direction in which an outer peripheral raceway surface 213 extends. In addition, hereinafter, a direction orthogonal to the virtual line Z4 is referred to as an orthogonal direction (see the virtual line Z5 in FIG. 13).

When details of the second embodiment are described, a pair of first facing surfaces 215 and 215 of the recess portion 214 extends in parallel with the spiral direction (see the virtual line Z4). The pair of second facing surfaces 216 and 216 of the recess portion 214 extends linearly. In addition, the pair of second facing surfaces 216 and 216 is parallel to an axial direction (see a shaft center O1). Note that the first facing surfaces 215 are longer than the second facing surfaces 216. Thus, the deflector 205 and the recess portion 214 viewed from the outer side in the radial direction are parallelograms longer in an intersection direction Y than in the axial direction. An inside corner portion where an end portion of each of the first facing surfaces 215 and an end portion of each of the second facing surfaces 216 merge is formed in an arc shape when viewed from the outer side in the radial direction, and is formed as an inside corner R portion 217. A screw shaft-side opening 213*b* of the outer peripheral raceway surface 213 is open across the second facing surface 216 and the inside corner R portion 217.

An outer shape (outer peripheral surface 224) of the deflector 205 is the same as an inner shape (inner peripheral surface 214*b*) of the recess portion 214. That is, a pair of first side surfaces 225 and 225 of the deflector 205 extends in parallel with the spiral direction (see the virtual line Z4 in FIG. 12). A pair of second side surfaces 226 and 226 of the deflector 205 extends linearly and is parallel to the axial direction (see the shaft center O1). A corner portion where an end portion of each of the first side surfaces 225 and an end portion of each of the second side surfaces 226 merge is formed in an arc shape when viewed in the radial direction, and is formed as a corner R portion 227.

Similarly to the first embodiment, an S-shaped groove surface 221 of the deflector 205 is formed point-symmetrically with respect to a center C. Furthermore, as described above, the outer shape (outer peripheral surface 224) of the deflector 205 is also formed point-symmetrically with respect to the center C. Thus, the deflector 205 can be assembled to the recess portion 214 in a state of being rotated by 180°. The S-shaped groove surface 221 has a central groove surface 230 and entrance/exit groove surfaces 231. The entrance/exit groove surfaces 231 extend in parallel with the outer peripheral raceway surface 213 (extends in parallel with the spiral direction Z4) similarly to the first embodiment. A deflector-side opening 232 of each of the entrance/exit groove surfaces 231 is open across the second side surface 226 and the corner R portion 227. In addition, similarly to the first embodiment, a groove shape of the entrance/exit groove surfaces 231 is larger than a groove shape of the outer peripheral raceway surface 213.

A screw thread 213*a* of the outer peripheral raceway surface 213 of a screw shaft 202 is cut out in a range overlapped with the recess portion 214. Thus, a part of the screw thread 213*a* adjacent to the recess portion 214 in the axial direction is a thin portion 218 having a small thickness in the orthogonal direction. The first facing surfaces 215 of the present embodiment extend in the spiral direction and are parallel to the screw thread 213*a*. Thus, a thickness W of the thin portion 218 in the orthogonal direction is uniform throughout a direction in which the thin portion 218 extends. Thus, there is no region in which strength is relatively weak in the thin portion 218, and deformation of the screw thread 213*a* (thin portion 218) is avoided.

Figure 13:
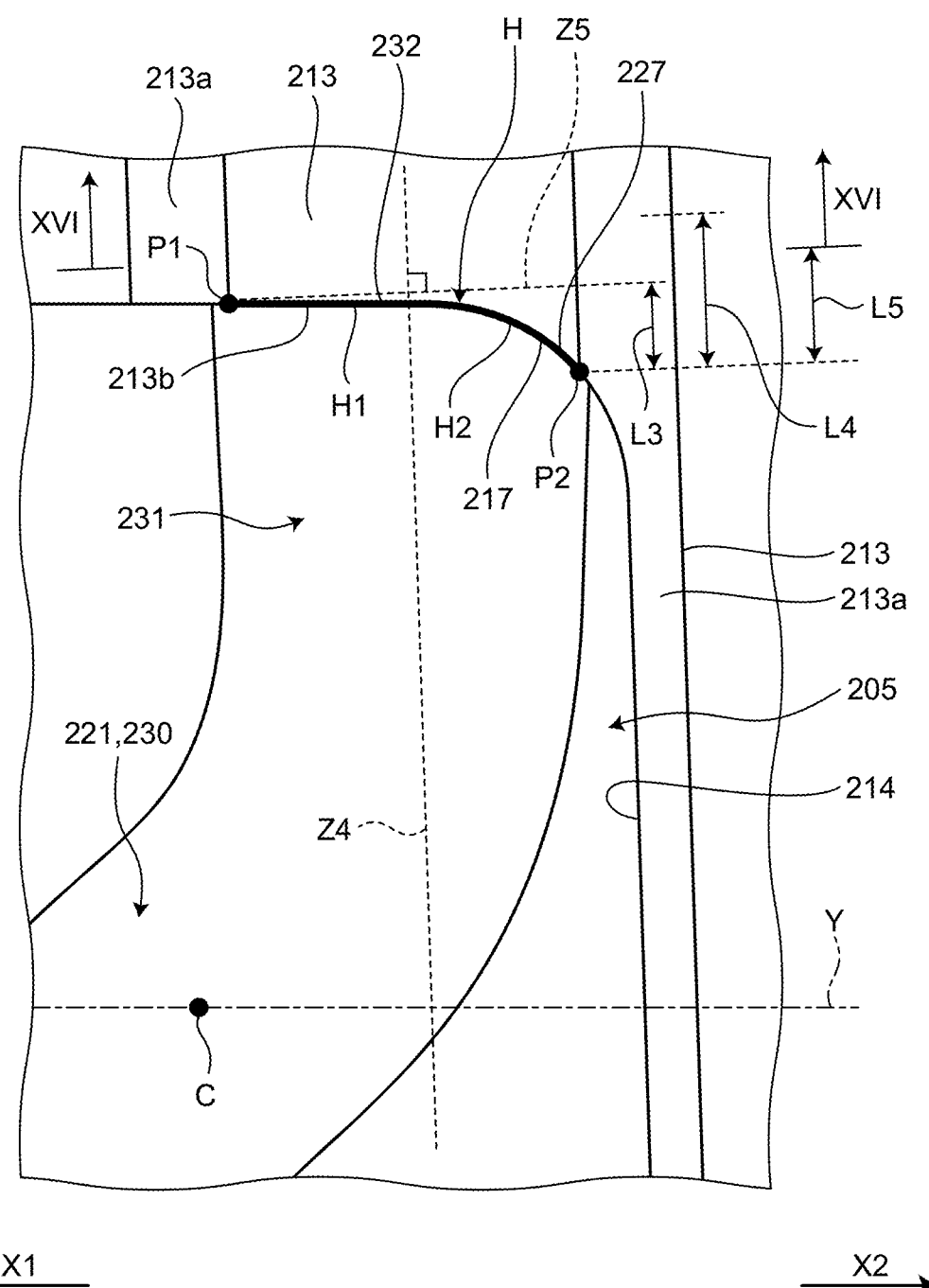
FIG. 13 is an enlarged view in which a vicinity of a deflector-side opening and a screw shaft-side opening in FIG. 12 is enlarged.

FIG. 13 is an enlarged view in which a vicinity of the deflector-side opening and the screw shaft-side opening in FIG. 12 is enlarged. A boundary line H between the deflector-side opening 232 and the screw shaft-side opening 213*b* viewed from the outer side in the radial direction includes a linear portion H1 having a linear shape and a curved portion H2 having an arc shape. Note that in FIG. 13, in order to make it easy to see the boundary line H, the boundary line H is drawn with a line thicker than other lines. In addition, a start point P1 and an end point P2 of the boundary line H are an end portion in a first direction X1 and an end portion in a second direction X2 in the screw shaft-side opening 213*b*. The linear portion H1 overlaps with the second facing surface 216 and the second side surface 226. The curved portion H2 overlaps with the inside corner R portion 217 and the corner R portion 227. The linear portion H1 extends in the axial direction and is slightly inclined in the orthogonal direction (see the virtual line Z5). The curved portion H2 has a longer length in the spiral direction (see the virtual line Z4) than the linear portion H1. A length of the boundary line H in the spiral direction (see the virtual line Z4) is L3.

Next, an effect of the present embodiment will be described. Note that before description of the effect of the present embodiment, a ball screw device 1101 of a third comparative example will be described.

Figure 14:
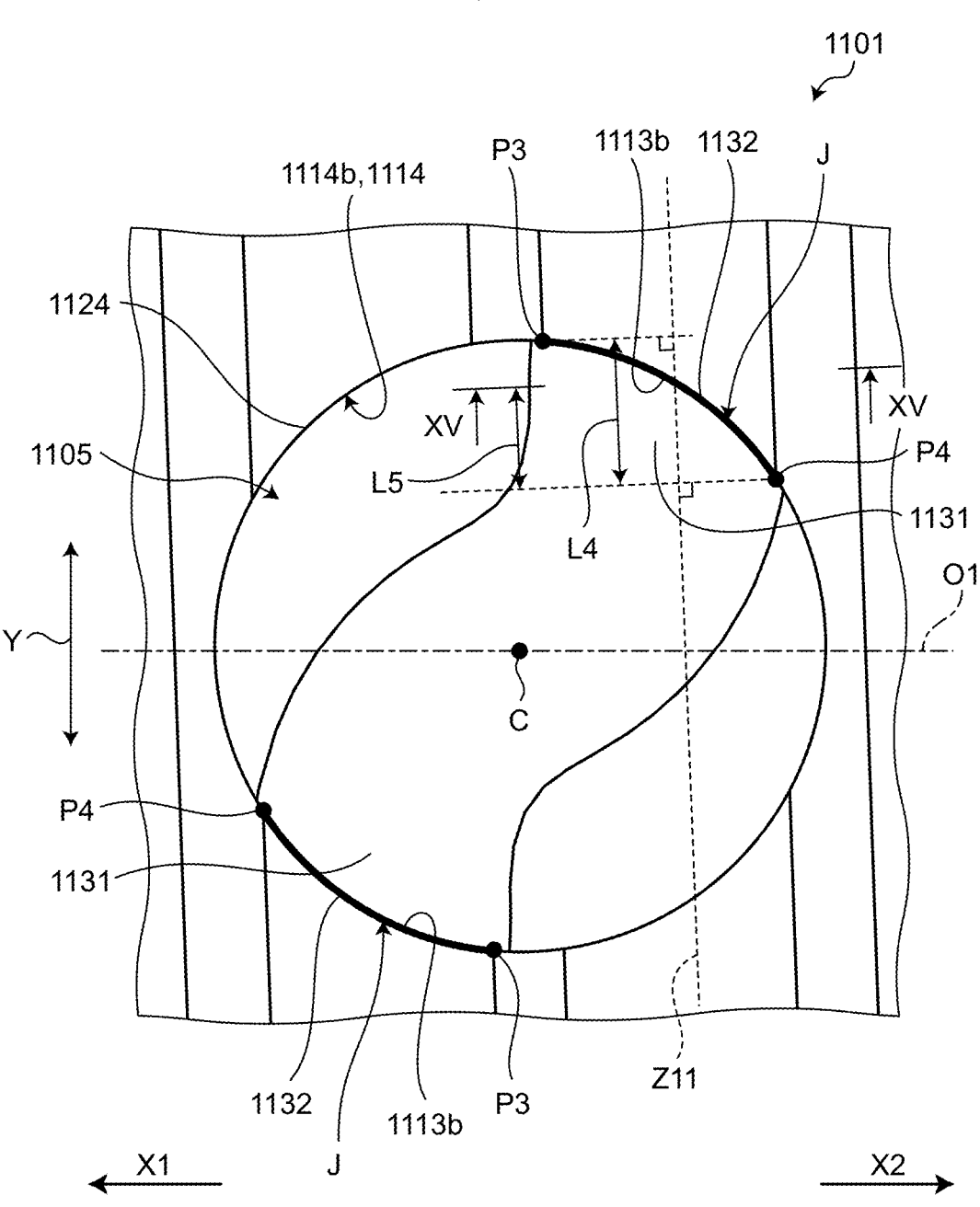
FIG. 14 is an enlarged view of a recess portion and a deflector of a third comparative example as viewed from an outer side in a radial direction.
Figure 15:
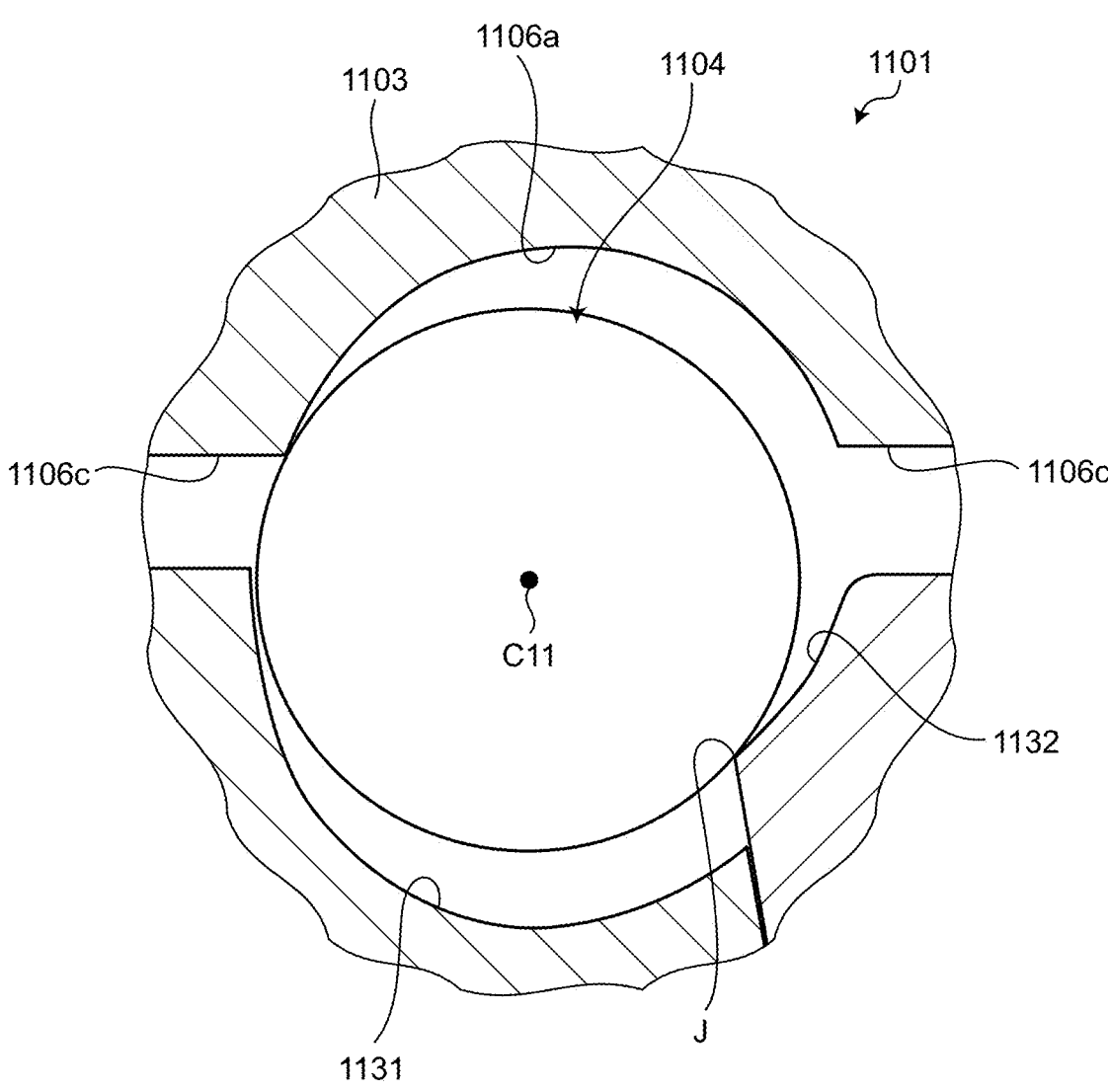
FIG. 15 is a cross-sectional view taken along a line XV-XV in FIG. 14.

FIG. 14 is an enlarged view of a recess portion and a deflector of the third comparative example as viewed from an outer side in a radial direction. FIG. 15 is a cross-sectional view taken along a line XV-XV in FIG. 14. Note that the cross-sectional view of FIG. 15 is a cross section cut at a point (line XV-XV) away for a length L5 from an end point P4 of a boundary line J, and is a cross-sectional view that is along the virtual line D of FIG. 4 and is cut in the radial direction passing through the shaft center O1. In a ball screw device 1101 of the third comparative example, an outer shape (outer peripheral surface 1124) of a deflector 1105 and an inner shape (inner peripheral surface 1114*b*) of a recess portion 1114 are circular. A boundary line J between a deflector-side opening 1132 and a screw shaft-side opening 1113*b* viewed from an outer side in a radial direction has a circular shape. Note that a start point P3 and an end point P4 of the boundary line J are an end portion in a first direction X1 and an end portion in a second direction X2 in the screw shaft-side opening 1113*b*. The boundary line J of the third comparative example includes only a curved portion. A length of the boundary line J in a spiral direction is L4. As illustrated in FIG. 13, the length L4 of the boundary line J is longer than the length L3 of the boundary line H of the second embodiment.

Here, in a case where a ball 1104 moves from an S-shaped groove surface 1121 to an outer peripheral raceway surface 1113, the ball 1104 overlaps with the boundary line J when viewed from the outer side in the radial direction In a case where the ball 1104 and the boundary line J overlap with each other, as illustrated in FIG. 15, in a groove surface on an inner side in the radial direction of the ball 1104, the outer peripheral raceway surface 1113 is arranged on one side in the axial direction, and an entrance/exit groove surface 1131 is arranged on the other side in the axial direction. In addition, a groove shape of the entrance/exit groove surface 1131 is larger than a groove shape of the outer peripheral raceway surface 1113. Thus, a space in which the ball 1104 can move is provided on the other side in the axial direction (side where the entrance/exit groove surface 1131 is arranged when viewed from the outer peripheral raceway surface 1113).

Thus, in a case of moving from the S-shaped groove surface 1121 to the outer peripheral raceway surface 1113, the ball 1104 is guided by the outer peripheral raceway surface 1113 and easily moves to the other side in the axial direction. Here, when the ball 1104 moves to the other side in the axial direction, as illustrated in FIG. 15, the ball 1104 is likely to be sandwiched between a corner portion (boundary line J) of the outer peripheral raceway surface 1113 and a groove shoulder (screw thread 1106*c*) of a nut 1103. This sandwiched state is not preferable since the ball 1104 does not roll smoothly and conversion efficiency of the ball screw device 1101 is decreased. In the third comparative example, as illustrated in FIG. 14, since the length L4 of the boundary line J in the spiral direction is long, the ball 1104 easily moves to the other side in the axial direction. That is, as illustrated in FIG. 15, the ball 1104 is likely to be in a state of being sandwiched between the corner portion of the outer peripheral raceway surface 1113 and the groove shoulder of the nut 1103.

Figure 16:
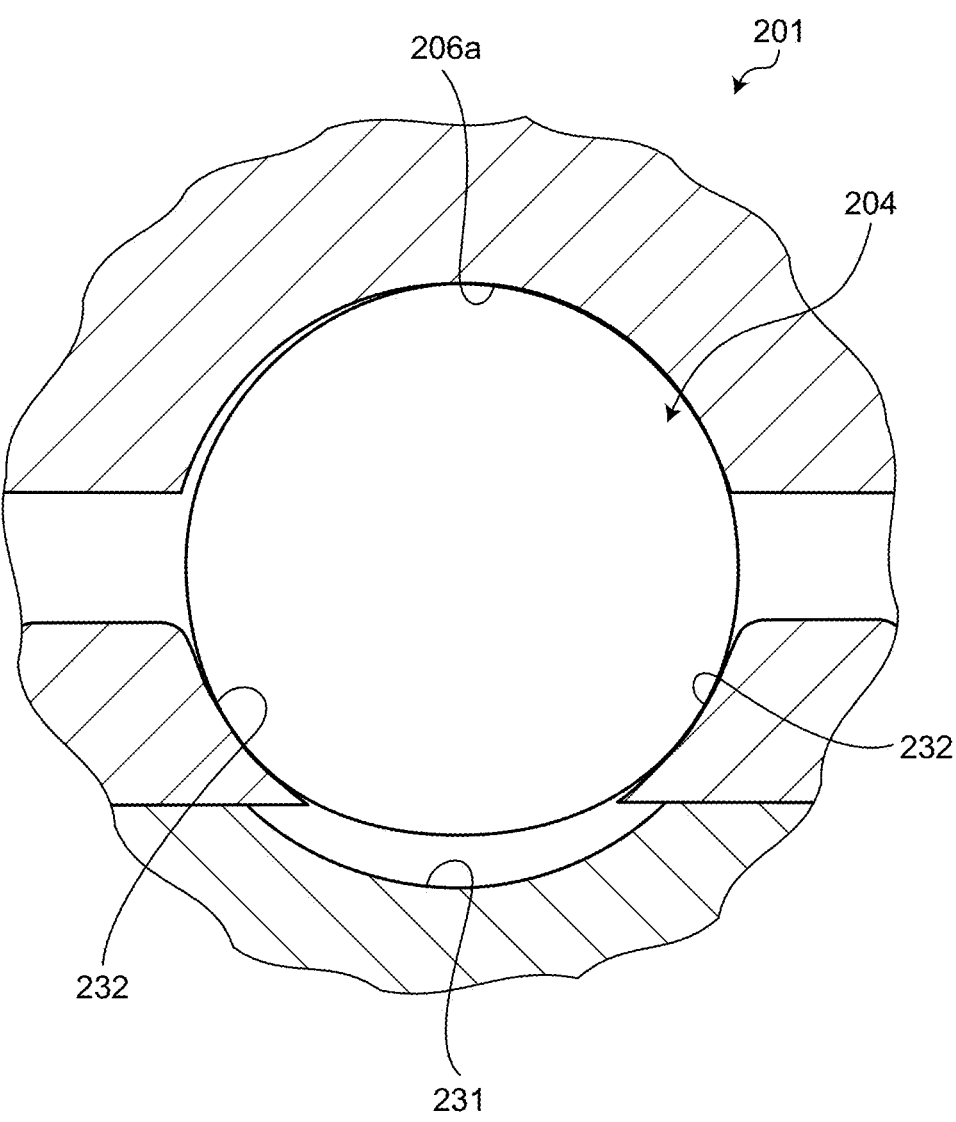
FIG. 16 is a cross-sectional view taken along a line XVI-XVI in FIG. 13.

FIG. 16 is a cross-sectional view taken along a line XVI-XVI in FIG. 13. Note that the cross-sectional view of FIG. 16 is a cross section cut at a point (line XVI-XVI) away for the length L5 from an end point P2 of a boundary line H, and is a cross-sectional view that is along the virtual line D of FIG. 4 and is cut in the radial direction passing through the shaft center O1. On the other hand, according to the second embodiment, when a ball 204 rolls for the length L5 from the end point P2 of the boundary line H (see FIG. 12) toward the outer peripheral raceway surface 213, as illustrated in FIG. 16, the outer peripheral raceway surface 213 is arranged on both sides in the axial direction in the groove surface on the inner side in the radial direction of the ball 204, and the ball 204 rolls smoothly between an inner peripheral raceway surface 206*a* and the outer peripheral raceway surface 213.

From the above, according to the present embodiment, the boundary line H of the second embodiment has the linear portion H1 and has a short length in the spiral direction. Thus, the ball 204 hardly moves to the other side in the axial direction (side of the entrance/exit groove surfaces 231 when viewed from the side of the outer peripheral raceway surface 213), and the ball 204 is hardly sandwiched between the corner portion of the outer peripheral raceway surface 213 and a groove shoulder (screw thread) of an inner peripheral raceway surface 206*a*. Thus, a decrease in the conversion efficiency of the ball screw device 201 is controlled.

As described above, in the ball screw device 201 of the second embodiment, a S-shaped groove surface 221 includes the central groove surface 230 in which the ball 204 sinks to the inner side in the radial direction, and the two entrance/exit groove surfaces 231 which are provided on the both sides of the central groove surface 230 and through which the ball 204 enters and exits. The groove shape of the entrance/exit groove surfaces 231 is larger than the groove shape of the outer peripheral raceway surface 213. The deflector-side opening 232 of the S-shaped groove surface 221 is provided in the outer peripheral surface 224 of the deflector 205. In an inner peripheral surface 214*a* of the recess portion 214, the screw shaft-side opening 213*b* of the outer peripheral raceway surface 213 continuous with the deflector-side opening 232 is provided. At least a part of the boundary line H between the deflector-side opening 232 and the screw shaft-side opening 213*b* viewed from the outer side in the radial direction includes the linear portion H1 that extends linearly in the axial direction.

According to the ball screw device 201 of the second embodiment, the ball 204 is hardly sandwiched at the boundary between the entrance/exit groove surfaces 231 and the outer peripheral raceway surface 213, and the decrease in the conversion efficiency of the ball screw device 201 is controlled.

Next, a third modification example, a fourth modification example, and a fifth modification example in each of which a part of the second embodiment is modified will be described.

Figure 17:
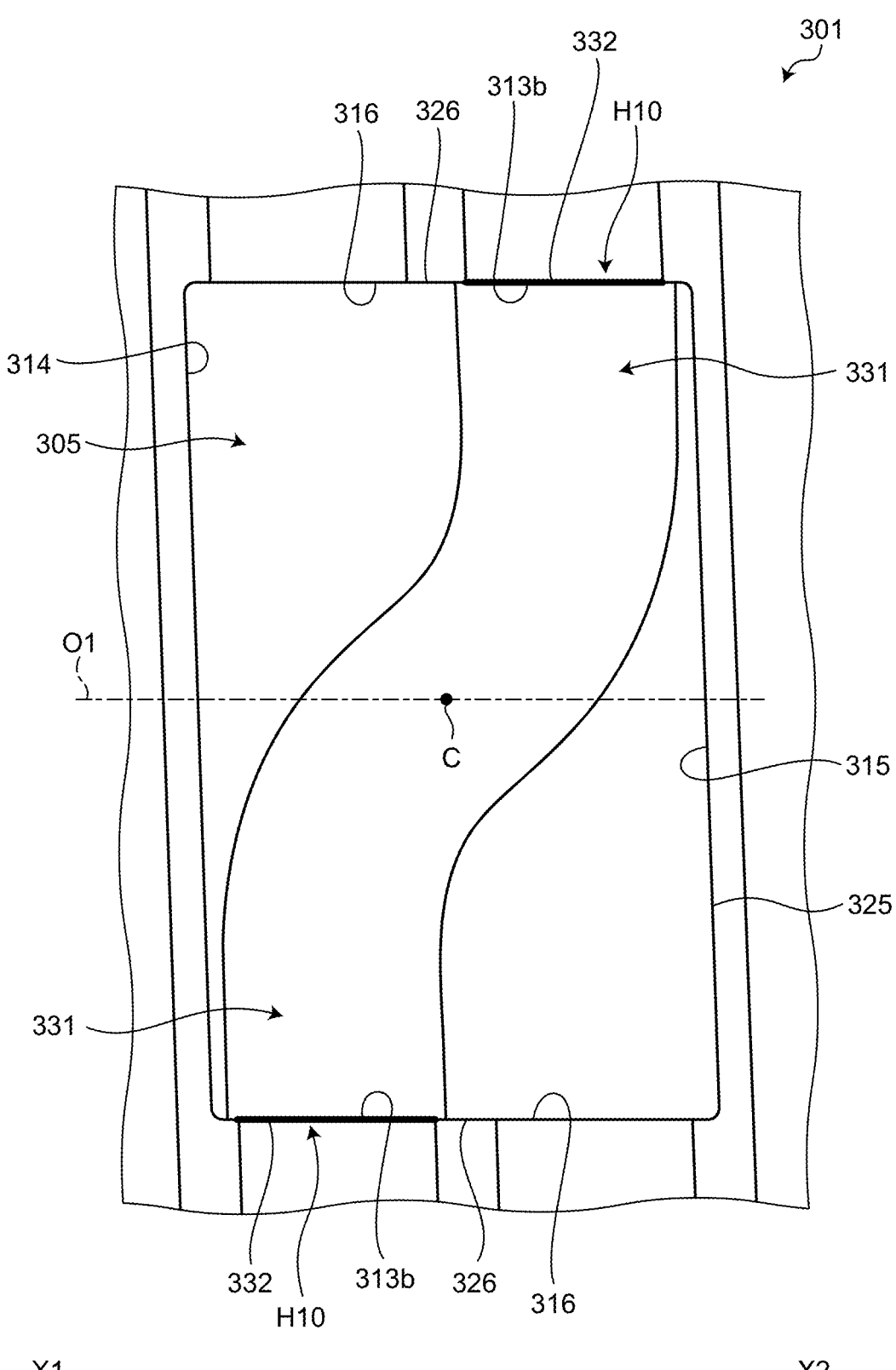
FIG. 17 is an enlarged view of a recess portion and a deflector of a third modification example as viewed from an outer side in a radial direction.

FIG. 17 is an enlarged view of a recess portion and a deflector of the third modification example as viewed from an outer side in a radial direction. As illustrated in FIG. 17, in a ball screw device 301 of the third modification example, an inside corner R portion 217 (see FIG. 12) is not provided at an inside corner portion where an end portion of a first facing surface 315 and an end portion of a second facing surface 316 of a recess portion 314 merge. In addition, a corner R portion 227 (see FIG. 12) is not provided at a corner portion where an end portion of a first side surface 325 and an end portion of a second side surface 326 merge. Thus, a screw shaft-side opening 313*b* opens only from the second facing surface 316. In addition, a deflector-side opening 332 opens only from the second side surface 326. Thus, a boundary line H10 between the screw shaft-side opening 313*b* and the deflector-side opening 332 is formed only of a linear portion extending in an axial direction. According to the boundary line H10, a length of the boundary line H10 in a spiral direction is significantly shortened. That is, according to the third modification example, a ball 204 is less likely to be sandwiched compared to the second embodiment, and circulation of the ball (not illustrated) becomes smooth.

Figure 18:
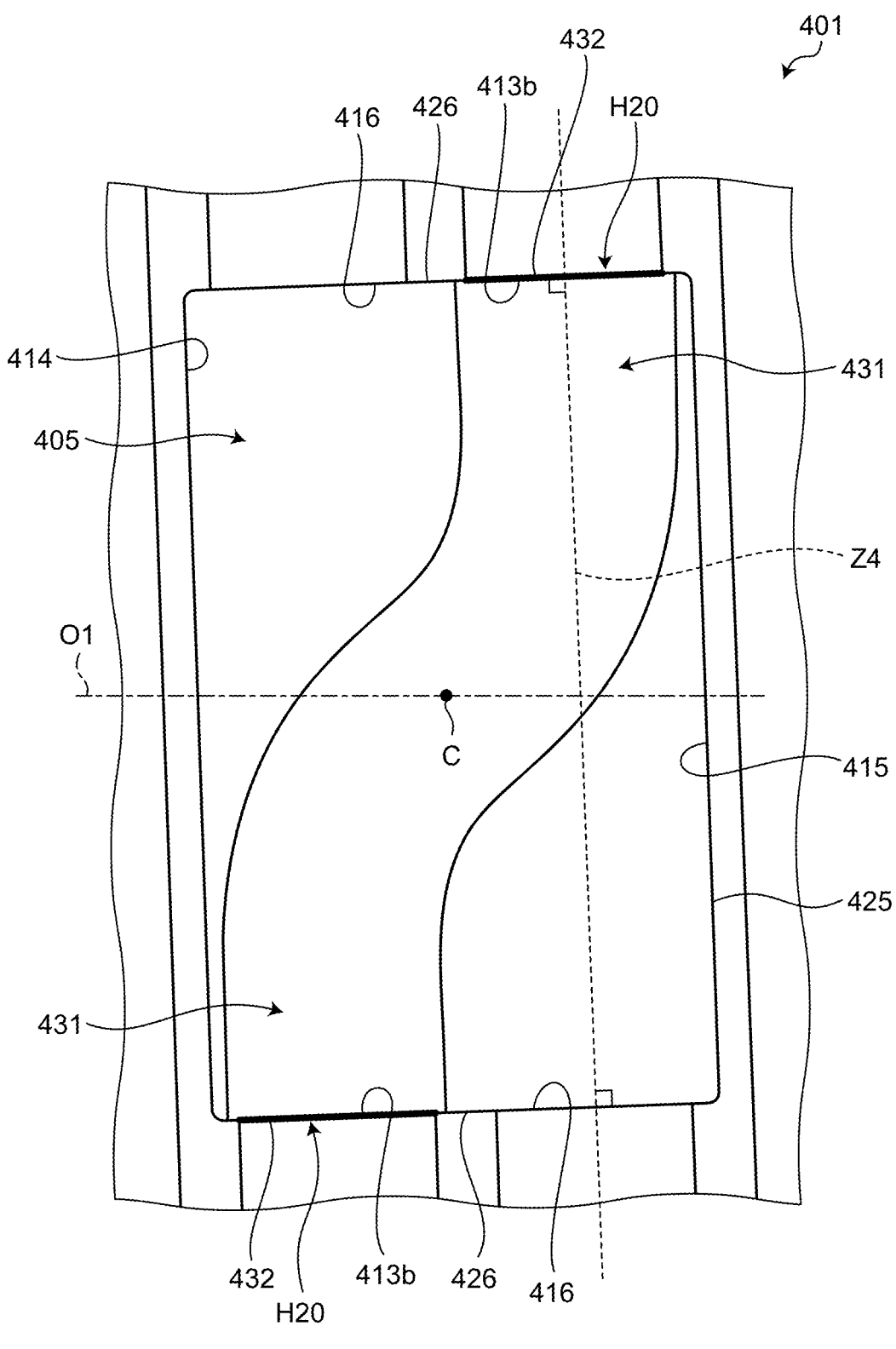
FIG. 18 is an enlarged view of a recess portion and a deflector of a fourth modification example as viewed from an outer side in a radial direction.

FIG. 18 is an enlarged view of a recess portion and a deflector of the fourth modification example as viewed from an outer side in a radial direction. In a ball screw device 401 of the fourth modification example, similarly to the ball screw device 301 of the third modification example, an inside corner R portion 217 (see FIG. 12) and a corner R portion 227 (see FIG. 12) are not provided. Thus, a screw shaft-side opening 413*b* opens only from a second facing surface 416. In addition, a deflector-side opening 432 opens only from a second side surface 426. Thus, a boundary line H20 between the screw shaft-side opening 413*b* and the deflector-side opening 432 is formed only of a linear portion extending in an axial direction. In addition, the second facing surface 416 and the second side surface 426 are orthogonal to a spiral direction Z-Z4 (extend in an orthogonal direction). That is, when viewed from the outer side in the radial direction, a deflector 405 and a recess portion 414 are rectangular. Furthermore, a length of the boundary line H20 in the spiral direction of the fourth modification example is a point, and a ball (not illustrated) is not sandwiched. Thus, according to the fourth modification example, circulation of the ball (not illustrated) becomes smoother than that of the third modification example, and a decrease in conversion efficiency of the ball screw device 401 is controlled.

Figure 19:
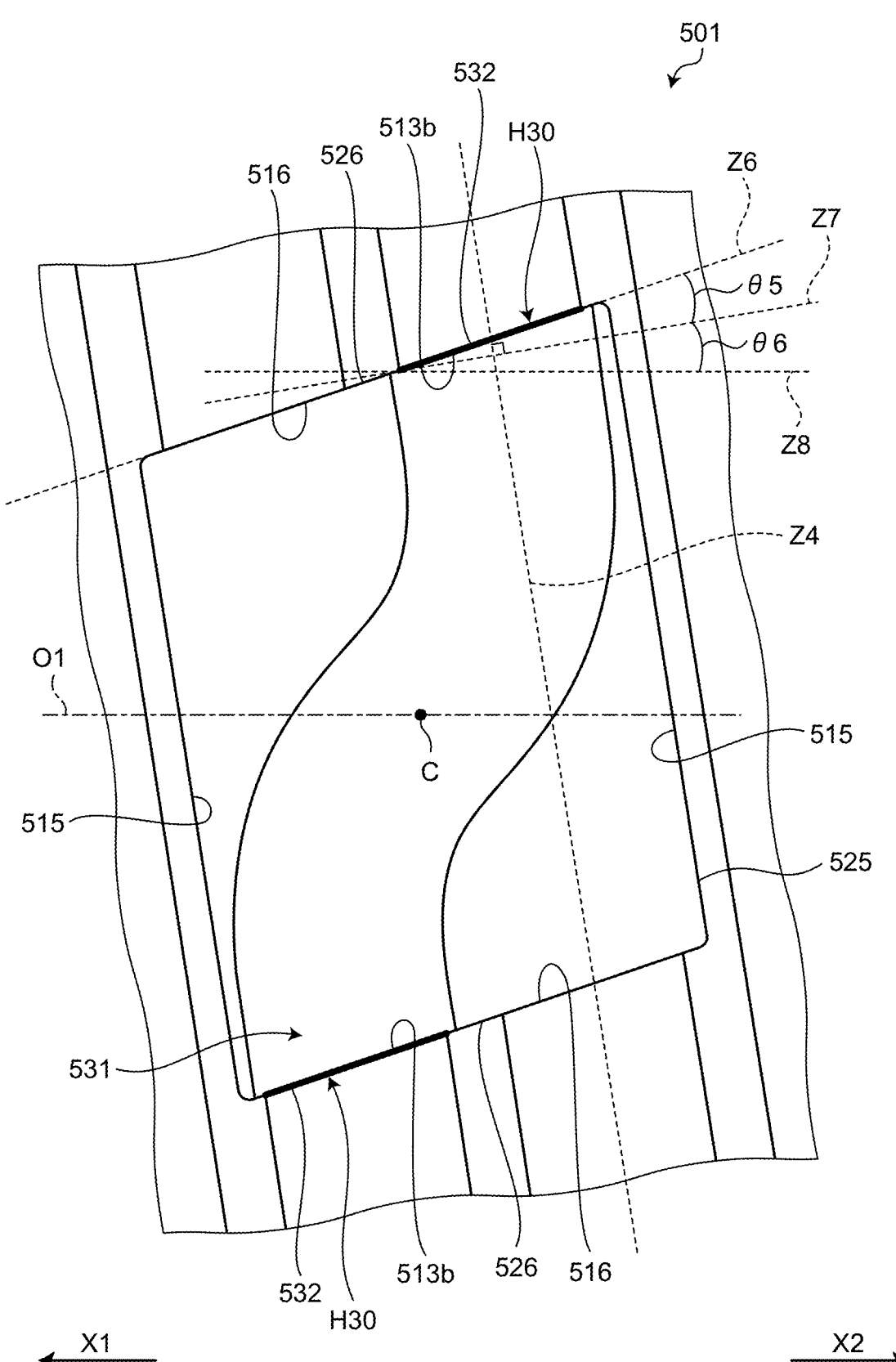
FIG. 19 is an enlarged view of a recess portion and a deflector of a fifth modification example as viewed from an outer side in a radial direction.

FIG. 19 is an enlarged view of a recess portion and a deflector of a fifth modification example as viewed from an outer side in a radial direction. As illustrated in FIG. 19, similarly to the ball screw device 301 of the third modification example, a ball screw device 501 of the fifth modification example is not provided with an inside corner R portion 217 (see FIG. 12) and a corner R portion 227 (see FIG. 12). Thus, a screw shaft-side opening 513b opens only from a second facing surface 516. In addition, a deflector-side opening 532 opens only from a second side surface 526. That is, a boundary line H30 between the screw shaft-side opening 513b and the deflector-side opening 532 is formed only of a linear portion.

The second facing surface 516 and the second side surface 526 extend along a virtual line Z6. In other words, the boundary line H30 is in parallel with the virtual line Z6. The virtual line Z6 intersects with a virtual line Z7. The virtual line Z7 is orthogonal to a virtual line Z4 extending in a spiral direction. A first intersection angle between the virtual line Z6 and the virtual line Z7 is θ5. In addition, a second intersection angle between a virtual line Z8 extending in an axial direction and the virtual line Z7 is θ6. The first intersection angle θ5 and the second intersection angle θ6 are the same. Thus, the virtual line Z6 and the virtual line Z8 are line-symmetric with respect to the virtual line Z7 extending in an orthogonal direction. That is, the boundary line H30 is line-symmetric with the boundary line H10 of the third modification example (see FIG. 17) with respect to the virtual line Z7. Thus, with respect to a length in a spiral direction, the boundary line H30 of the fifth modification example and the boundary line H10 of the third modification example are the same. Then, even in such a ball screw device 501 of the fifth modification example, the length of the boundary line H30 in the spiral direction is significantly shortened similarly to the third modification example. Thus, a ball is hardly sandwiched, and circulation of the ball becomes smooth.

Although the second embodiment, the third modification example, the fourth modification example, and the fifth modification example have been described above, a direction of a linear portion is not limited to one extending in the axial direction and described in the second embodiment and the third modification example, one extending in the orthogonal direction and described in the fourth modification example, and one extending in the direction parallel to the virtual line Z6 and described in the fifth modification example in the present disclosure. The present disclosure may be, for example, a linear portion extending at an angle between the axial direction and the orthogonal direction (between the virtual line Z7 and the virtual line Z8 illustrated in FIG. 19). Alternatively, a linear portion extending at an angle between the virtual line Z6 and the virtual line Z7 may be employed. In addition, in the present disclosure, a linear portion may be inclined in a tolerance range with respect to the virtual line Z8. That is, the linear portion extending in the axial direction includes a linear portion inclined within the tolerance range with respect to the virtual line Z8 in addition to the linear portion extending along the virtual line Z8.

In addition, a length of the linear portion is not limited. However, since the length of the boundary line in the spiral direction becomes shorter as a proportion of the linear portion in the boundary line is larger than that of the curved portion, it is preferable that the proportion of the linear portion in the boundary line is larger. Furthermore, although the linear portion extending in the orthogonal direction (boundary line H30) has been described in the fourth modification example, the present disclosure may be a boundary line having a linear portion and a curved portion extending in the orthogonal direction.

Note that although not specifically joined, a deflector may have interference with respect to a recess portion, or a deflector may be loosely fitted into a recess portion in the ball screw devices of the second embodiment, the third modification example, and the fourth modification example, and there is not specifically a limitation. Furthermore, in a case where the deflector is loosely fitted into the recess portion, a protrusion that abuts on an inner peripheral surface of the recess portion and that is crushed may be provided on an outer peripheral surface of the deflector. Furthermore, although the pair of first facing surfaces 215 extends in the spiral direction in order to make the thickness W of the thin portion 218 constant in the second embodiment, application to the ball screw device of the first embodiment may be performed.

REFERENCE SIGNS LIST 1, 201, 301, 401, 1001, 1101 BALL SCREW DEVICE
2, 1002 SCREW SHAFT
3, 1003 NUT
4, 1004, 1104 BALL
5, 5A, 205, 305, 405, 505, 1005, 1105 DEFLECTOR
6 NUT MAIN BODY
6a, 1006a, 1113 OUTER PERIPHERAL RACEWAY SURFACE
7 LID PORTION
11 SCREW SHAFT MAIN BODY
13, 213, 1013 OUTER PERIPHERAL RACEWAY SURFACE
14, 214, 314, 414 RECESS PORTION
6c, 13a, 1006c, 1013a SCREW THREAD
13b, 213b, 313b, 413b, 513b, 1113b SCREW SHAFT-SIDE OPENING
14b INNER PERIPHERAL SURFACE
15, 215, 315 FIRST FACING SURFACE
16, 216, 316, 416, 516 SECOND FACING SURFACE
21, 221, 1021 S-SHAPED GROOVE SURFACE
22 TANG
24, 224 OUTER PERIPHERAL SURFACE
25, 225 FIRST SIDE SURFACE
26, 226, 326, 426, 526 SECOND SIDE SURFACE
30, 230 CENTRAL GROOVE SURFACE
31, 231 ENTRANCE/EXIT GROOVE SURFACE
32, 232, 332, 432, 532, 1132 DEFLECTOR-SIDE OPENING
50 PROTRUSION
217 INSIDE CORNER R PORTION
218 THIN PORTION
227 CORNER R PORTION
H, H10, H20, H30, J BOUNDARY LINE
H1 LINEAR PORTION
H2 CURVED PORTION

The invention claimed is:
1. A ball screw device comprising:
a screw shaft in which an outer peripheral raceway surface is provided on an outer peripheral surface;
a nut into which the screw shaft is inserted and in which an inner peripheral raceway surface is provided on an inner peripheral surface;

a plurality of balls arranged on a raceway between the outer peripheral raceway surface and the inner peripheral raceway surface; and at least one deflector provided with an S-shaped groove surface that circulates the balls, wherein the outer peripheral surface of the screw shaft is provided with a recess portion that is recessed to an inner side in a radial direction and that houses the deflector, and an inner peripheral surface of the recess portion and an outer peripheral surface of the deflector are not circular when viewed from an outer side in the radial direction of the screw shaft, wherein the S-shaped groove surface includes:

a central groove surface on which the balls sink to the inner side in the radial direction, and two entrance/exit groove surfaces which are respectively provided on both sides of the central groove surface and through which the balls enter and exit, a groove shape of the entrance/exit groove surfaces is larger than a groove shape of the outer peripheral raceway surface, a deflector-side opening of the S-shaped groove surface is provided in the outer peripheral surface of the deflector, a screw shaft-side opening of the outer peripheral raceway surface that continues to the deflector-side opening is provided in the inner peripheral surface of the recess portion, and at least a part of a boundary line between the deflector-side opening and the screw shaft-side opening viewed from the outer side in the radial direction includes a linear portion extending linearly in an axial direction and disposed at the entrance/exit groove surfaces.

2. The ball screw device according to claim 1, wherein a height of a screw thread on the outer peripheral raceway surface is higher than a height of a screw thread on the inner peripheral raceway surface.

3. The ball screw device according to claim 1, wherein when viewed from the outer side in the radial direction of the screw shaft, a length in an intersection direction, which intersects with an axial direction parallel to the screw shaft, of the recess portion and the deflector is longer than a length thereof in the axial direction.

4. The ball screw device according to claim 1, wherein the outer peripheral surface of the deflector has an interference with respect to the inner peripheral surface of the recess portion.

5. The ball screw device according to claim 4, wherein the inner peripheral surface of the recess portion includes a pair of first facing surfaces facing each other, and a pair of second facing surfaces facing each other and arranged between the pair of first facing surfaces, the outer peripheral surface of the deflector includes a pair of first side surfaces facing the pair of first facing surfaces, and a pair of second side surfaces facing the pair of second facing surfaces, the pair of first facing surfaces and the pair of first side surfaces are linear when viewed from the outer side in the radial direction, the pair of second facing surfaces and the pair of second side surfaces have an arc shape when viewed from the outer side in the radial direction, and the pair of first side surfaces has the interference with respect to the pair of first facing surfaces.

6. The ball screw device according to claim 1, wherein the deflector is loosely fitted into the recess portion.

7. The ball screw device according to claim 6, wherein the deflector includes at least one protrusion that protrudes from the outer peripheral surface and is crushed by abutting on the inner peripheral surface of the recess portion.

8. The ball screw device according to claim 1, wherein the S-shaped groove surface includes a central groove surface on which the balls sink to the inner side in the radial direction, and two entrance/exit groove surfaces which are respectively provided on both sides of the central groove surface and through which the balls enter and exit.

9. The ball screw device according to claim 1, wherein a screw shaft-side opening of the outer peripheral raceway surface is provided in the inner peripheral surface of the recess portion, a deflector-side opening of the S-shaped groove surface is provided in the outer peripheral surface of the deflector, and a groove shape of the deflector-side opening is larger than a groove shape of the screw shaft-side opening.

10. The ball screw device according to claim 1, wherein the linear portion is orthogonal to a spiral direction in which the balls roll.

11. The ball screw device according to claim 1, wherein the linear portion is parallel to the axial direction.

12. The ball screw device according to claim 1, wherein the entire boundary line is the linear portion.

13. The ball screw device according to claim 1, wherein the outer peripheral surface of the deflector has interference with respect to the inner peripheral surface of the recess portion.

14. The ball screw device according to claim 1, wherein the deflector is loosely fitted into the recess portion.

15. The ball screw device according to claim 14, wherein the deflector includes at least one protrusion that protrudes from the outer peripheral surface and is crushed by abutting on the inner peripheral surface of the recess portion.

16. The ball screw device according to claim 1, wherein the inner peripheral surface of the recess portion includes a pair of first peripheral surfaces facing each other and extending in a circumferential direction, the outer peripheral surface of the deflector includes a pair of second peripheral surfaces facing the first peripheral surfaces, and the first peripheral surfaces and the second peripheral surfaces are parallel to a spiral direction in which the balls roll.

17. The ball screw device according to claim 1, wherein the nut includes a nut main body having a cylindrical shape and provided with the inner peripheral raceway surface on an inner peripheral surface, and a lid portion that seals one opening of the nut main body.

* * * * *